(12) United States Patent
Segal et al.

(10) Patent No.: US 11,206,281 B2
(45) Date of Patent: Dec. 21, 2021

(54) VALIDATING THE USE OF USER CREDENTIALS IN A PENETRATION TESTING CAMPAIGN

(71) Applicant: XM Cyber Ltd., Herzelyia (IL)

(72) Inventors: Ronen Segal, Hertzliya (IL); Yaron Shani, Holon (IL); Igal Gofman, Rosh-Haayin (IL)

(73) Assignee: XM Cyber Ltd., Hertsliya (IL)

( * ) Notice: Subject to any disclaimer, the term of this patent is extended or adjusted under 35 U.S.C. 154(b) by 138 days.

(21) Appl. No.: 16/838,054

(22) Filed: Apr. 2, 2020

(65) Prior Publication Data

US 2020/0358805 A1 Nov. 12, 2020

Related U.S. Application Data

(60) Provisional application No. 62/844,776, filed on May 8, 2019.

(51) Int. Cl.
*H04L 29/06* (2006.01)
*G06F 11/07* (2006.01)

(52) U.S. Cl.
CPC ...... *H04L 63/1433* (2013.01); *G06F 11/0778* (2013.01); *H04L 63/083* (2013.01); *H04L 63/1441* (2013.01); *H04L 63/20* (2013.01)

(58) Field of Classification Search
CPC .............. H04L 63/1433; H04L 63/083; H04L 63/1441; H04L 63/20; G06F 11/0778; G06F 21/577; G06F 2221/034
See application file for complete search history.

(56) References Cited

U.S. PATENT DOCUMENTS 6,574,737 B1 6/2003 Kingsford et al.
6,711,127 B1 3/2004 Gorman et al.
(Continued)

FOREIGN PATENT DOCUMENTS

CN 103200230 A 7/2013
CN 103916384 A 7/2014
(Continued)

OTHER PUBLICATIONS

CN103200230 Machine Translation (by EPO and Google)—published Jul. 10, 2013; Li Qianmu.
(Continued)

*Primary Examiner* — Nelson S. Giddins
*Assistant Examiner* — Shu Chun Gao
(74) *Attorney, Agent, or Firm* — Momentum IP; Marc Van Dyke

(57) ABSTRACT

Carrying out a penetration testing campaign in a networked system by a penetration testing system, for determining a way for an attacker to compromise the networked system, comprises determining that the attacker can obtain user credentials of a first user, determining that when using the user credentials the first user has access rights to a first network node of the networked system, determining that a second network node of the networked system is compromisable by the attacker during the penetration testing campaign, determining that the first network node was accessed from the second network node, and based on the foregoing, determining that the first network node is compromisable by the attacker during the penetration testing campaign, and determining the way for the attacker to compromise the networked system which includes a step of compromising the first network node using the user credentials of the first user.

20 Claims, 22 Drawing Sheets

(56) References Cited

U.S. PATENT DOCUMENTS

| | | |
|---|---|---|
| 6,918,038 B1 | 7/2005 | Smith et al. |
| 6,952,779 B1 | 10/2005 | Cohen et al. |
| 7,013,395 B1 | 3/2006 | Swiler et al. |
| 7,296,092 B2 | 11/2007 | Nguyen |
| 7,693,810 B2 | 4/2010 | Donoho et al. |
| 7,757,293 B2 | 7/2010 | Caceres et al. |
| 7,926,113 B1 | 4/2011 | Gula et al. |
| 7,934,254 B2 | 4/2011 | Graham |
| 7,966,659 B1 | 6/2011 | Wilkinson et al. |
| 8,001,589 B2 | 8/2011 | Ormazabal et al. |
| 8,112,016 B2 | 2/2012 | Matsumoto et al. |
| 8,127,359 B2 | 2/2012 | Kelekar |
| 8,321,944 B1 | 11/2012 | Mayer et al. |
| 8,356,353 B2 | 1/2013 | Futoransky et al. |
| 8,365,289 B2 | 1/2013 | Russ et al. |
| 8,392,997 B2 | 3/2013 | Chen et al. |
| 8,490,193 B2 | 7/2013 | Sarraute Yamada et al. |
| 8,490,196 B2 | 7/2013 | Lucangeli Obes et al. |
| 8,650,651 B2 | 2/2014 | Podjarny et al. |
| 8,752,183 B1 | 6/2014 | Heiderich et al. |
| 8,813,235 B2 | 8/2014 | Sidagni |
| 8,844,041 B1 | 9/2014 | Kienzle et al. |
| 9,015,301 B2 | 4/2015 | Redlich et al. |
| 9,015,847 B1 | 4/2015 | Kaplan et al. |
| 9,076,013 B1 | 7/2015 | Bailey, Jr. et al. |
| 9,100,430 B1 | 8/2015 | Seiver et al. |
| 9,183,397 B2 | 11/2015 | Futoransky et al. |
| 9,215,245 B1 | 12/2015 | Rajab et al. |
| 9,224,117 B2 | 12/2015 | Chapman |
| 9,270,696 B2 | 2/2016 | Fritzson et al. |
| 9,276,952 B2 | 3/2016 | Simpson et al. |
| 9,292,695 B1 | 3/2016 | Bassett |
| 9,298,890 B2 * | 3/2016 | Bajenov .................. G06F 21/00 |
| 9,350,753 B2 | 5/2016 | Kaplan et al. |
| 9,412,073 B2 | 8/2016 | Brandt et al. |
| 9,467,467 B2 | 10/2016 | Alamuri |
| 9,473,522 B1 | 10/2016 | Kotler et al. |
| 9,558,355 B2 | 1/2017 | Madou et al. |
| 9,760,716 B1 | 9/2017 | Mulchandani |
| 9,781,149 B1 | 10/2017 | Himler et al. |
| 9,781,160 B1 | 10/2017 | Irimie et al. |
| 9,800,603 B1 | 10/2017 | Sidagni |
| 9,824,222 B1 | 11/2017 | Kaplan et al. |
| 9,870,715 B2 | 1/2018 | Sadeh-Koniecpol et al. |
| 9,894,090 B2 | 2/2018 | Hebert et al. |
| 9,912,687 B1 | 3/2018 | Wescoe et al. |
| 10,038,711 B1 | 7/2018 | Gorodissky et al. |
| 10,068,095 B1 | 9/2018 | Segal et al. |
| 10,108,803 B2 | 10/2018 | Chari et al. |
| 10,122,750 B2 | 11/2018 | Gorodissky et al. |
| 10,182,040 B2 | 1/2019 | Hu et al. |
| 10,257,220 B2 | 4/2019 | Gorodissky et al. |
| 10,291,643 B2 | 5/2019 | Marquez et al. |
| 10,367,846 B2 | 7/2019 | Gorodissky et al. |
| 10,382,473 B1 | 8/2019 | Ashkenazy et al. |
| 10,412,112 B2 | 9/2019 | Ashkenazy et al. |
| 10,440,044 B1 | 10/2019 | Zini et al. |
| 10,447,721 B2 | 10/2019 | Lasser |
| 10,454,966 B2 | 10/2019 | Gorodissky et al. |
| 10,462,177 B1 | 10/2019 | Lasser et al. |
| 10,469,521 B1 | 11/2019 | Segal et al. |
| 10,498,803 B1 | 12/2019 | Zini et al. |
| 10,503,911 B2 | 12/2019 | Chari et al. |
| 10,505,969 B2 | 12/2019 | Gorodissky et al. |
| 10,534,917 B2 | 1/2020 | Segal |
| 10,574,684 B2 | 2/2020 | Segal et al. |
| 10,574,687 B1 | 2/2020 | Lasser |
| 10,581,895 B2 | 3/2020 | Ashkenazy et al. |
| 10,637,882 B2 | 4/2020 | Gorodissky et al. |
| 10,637,883 B1 | 4/2020 | Segal et al. |
| 10,645,113 B2 | 5/2020 | Gorodissky et al. |
| 10,652,269 B1 | 5/2020 | Segal et al. |
| 10,686,822 B2 | 6/2020 | Segal |
| 10,686,823 B2 | 6/2020 | Gorodissky et al. |
| 2003/0140223 A1 | 7/2003 | Desideri |
| 2003/0195861 A1 | 10/2003 | McClure et al. |
| 2003/0208616 A1 | 11/2003 | Laing et al. |
| 2003/0212779 A1 | 11/2003 | Boyter et al. |
| 2003/0217039 A1 | 11/2003 | Kurtz et al. |
| 2004/0015728 A1 | 1/2004 | Cole et al. |
| 2004/0078384 A1 | 4/2004 | Keir et al. |
| 2004/0095907 A1 | 5/2004 | Agee et al. |
| 2004/0123158 A1 * | 6/2004 | Roskind ................ H04L 63/083 726/6 |
| 2005/0086502 A1 | 4/2005 | Rayes et al. |
| 2005/0100157 A1 | 5/2005 | Gray et al. |
| 2005/0102534 A1 | 5/2005 | Wong |
| 2006/0015943 A1 | 1/2006 | Mahieu |
| 2007/0011319 A1 | 1/2007 | McClure et al. |
| 2007/0204347 A1 | 8/2007 | Caceres et al. |
| 2007/0271360 A1 | 11/2007 | Sahita et al. |
| 2008/0092237 A1 | 4/2008 | Yoon et al. |
| 2008/0104702 A1 | 5/2008 | Choi et al. |
| 2008/0172716 A1 | 7/2008 | Talpade et al. |
| 2008/0209567 A1 | 8/2008 | Lockhart et al. |
| 2008/0244748 A1 | 10/2008 | Neystadt et al. |
| 2008/0256638 A1 | 10/2008 | Russ et al. |
| 2008/0288822 A1 | 11/2008 | Wu et al. |
| 2009/0044277 A1 | 2/2009 | Aaron |
| 2009/0049553 A1 | 2/2009 | Vasudeva |
| 2009/0172813 A1 | 7/2009 | Aaron |
| 2010/0138925 A1 | 6/2010 | Barai et al. |
| 2011/0016513 A1 | 1/2011 | Bailey, Jr. |
| 2011/0035803 A1 | 2/2011 | Lucangeli Obes et al. |
| 2011/0061104 A1 | 3/2011 | Sarraute Yamada et al. |
| 2011/0078507 A1 | 3/2011 | Choi et al. |
| 2012/0174228 A1 | 7/2012 | Giakouminakis et al. |
| 2012/0255022 A1 | 10/2012 | Ocepek et al. |
| 2013/0014263 A1 | 1/2013 | Porcello et al. |
| 2013/0031635 A1 | 1/2013 | Lotem et al. |
| 2013/0254857 A1 | 9/2013 | Bajenov et al. |
| 2013/0297375 A1 | 11/2013 | Chapman |
| 2014/0007241 A1 | 1/2014 | Gula et al. |
| 2014/0137257 A1 | 5/2014 | Martinez et al. |
| 2014/0165204 A1 | 6/2014 | Williams et al. |
| 2014/0173739 A1 | 6/2014 | Ahuja et al. |
| 2014/0237606 A1 | 8/2014 | Futoransky et al. |
| 2014/0328423 A1 | 11/2014 | Agee et al. |
| 2015/0058993 A1 | 2/2015 | Choi et al. |
| 2015/0237063 A1 | 8/2015 | Cotton et al. |
| 2016/0044057 A1 | 2/2016 | Chenette et al. |
| 2016/0134653 A1 | 5/2016 | Vallone et al. |
| 2016/0147635 A1 | 5/2016 | Schwarzmann |
| 2016/0234251 A1 | 8/2016 | Boice et al. |
| 2016/0234661 A1 | 8/2016 | Narasimhan et al. |
| 2016/0248800 A1 | 8/2016 | Ng et al. |
| 2016/0275289 A1 | 9/2016 | Sethumadhavan et al. |
| 2016/0342796 A1 | 11/2016 | Kaplan et al. |
| 2016/0352771 A1 | 12/2016 | Sivan et al. |
| 2017/0006055 A1 | 1/2017 | Strom et al. |
| 2017/0013008 A1 | 1/2017 | Carey et al. |
| 2017/0046519 A1 | 2/2017 | Cam |
| 2017/0063886 A1 | 3/2017 | Muddu et al. |
| 2017/0098086 A1 | 4/2017 | Hoernecke et al. |
| 2017/0104780 A1 | 4/2017 | Zaffarano et al. |
| 2017/0116421 A1 | 4/2017 | M C et al. |
| 2017/0123925 A1 | 5/2017 | Patnaik et al. |
| 2017/0149816 A1 | 5/2017 | Kelekar |
| 2017/0195346 A1 * | 7/2017 | Be'Ery ................ H04L 63/083 |
| 2017/0214701 A1 | 7/2017 | Hasan |
| 2017/0223043 A1 | 8/2017 | Munoz et al. |
| 2017/0279843 A1 | 9/2017 | Schultz et al. |
| 2017/0286690 A1 | 10/2017 | Chari et al. |
| 2017/0373923 A1 | 12/2017 | Kazachkov et al. |
| 2018/0018465 A1 | 1/2018 | Carey et al. |
| 2018/0054429 A1 | 2/2018 | Donahue |
| 2018/0103052 A1 | 4/2018 | Choudhury et al. |
| 2018/0219900 A1 | 8/2018 | Gorodissky et al. |
| 2018/0219901 A1 | 8/2018 | Gorodissky et al. |
| 2018/0219903 A1 | 8/2018 | Segal |
| 2018/0219904 A1 | 8/2018 | Gorodissky et al. |
| 2018/0219905 A1 | 8/2018 | Gorodissky et al. |
| 2018/0219909 A1 | 8/2018 | Gorodissky et al. |
| 2018/0270268 A1 | 9/2018 | Gorodissky et al. |

(56) References Cited

U.S. PATENT DOCUMENTS

| | | | |
|---|---|---|---|
| 2018/0330103 A1 | 11/2018 | Chari et al. | |
| 2018/0365429 A1 | 12/2018 | Segal | |
| 2019/0007428 A1 | 1/2019 | Moen et al. | |
| 2019/0014141 A1 | 1/2019 | Segal et al. | |
| 2019/0036961 A1 | 1/2019 | Gorodissky et al. | |
| 2019/0068631 A1 | 2/2019 | Ashkenazy et al. | |
| 2019/0081974 A1 | 3/2019 | Lasser | |
| 2019/0149572 A1 | 5/2019 | Gorodissky et al. | |
| 2019/0182270 A1 | 6/2019 | Kim | |
| 2019/0182286 A1 | 6/2019 | Zini | |
| 2019/0245883 A1 | 8/2019 | Gorodissky et al. | |
| 2019/0268369 A1 | 8/2019 | Gorodissky et al. | |
| 2019/0312903 A1 | 10/2019 | Zini et al. | |
| 2019/0364070 A1 | 11/2019 | Zini et al. | |
| 2019/0387015 A1 | 12/2019 | Ashkenazy et al. | |
| 2020/0106800 A1 | 4/2020 | Gorodissky et al. | |
| 2020/0145449 A1 | 5/2020 | Segal et al. | |
| 2020/0153852 A1 | 5/2020 | Segal et al. | |
| 2020/0236130 A1 | 7/2020 | Gorodissky et al. | |
| 2020/0280577 A1 | 9/2020 | Segal et al. | |

FOREIGN PATENT DOCUMENTS

| | | |
|---|---|---|
| CN | 104009881 A | 8/2014 |
| EP | 1559008 A1 | 8/2005 |
| EP | 3079336 A1 | 10/2016 |
| WO | 0038036 A2 | 6/2000 |
| WO | 2008054982 A2 | 5/2008 |
| WO | 2010069587 A1 | 6/2010 |
| WO | 2013087982 A1 | 6/2013 |
| WO | 2015111039 A1 | 7/2015 |
| WO | 2016081561 A1 | 5/2016 |
| WO | 2016164844 A1 | 10/2016 |
| WO | 2018156394 A1 | 8/2018 |

OTHER PUBLICATIONS

CN103916384 Machine Translation (by EPO and Google)—published Jul. 9, 2014 Zhong Li.
CN104009881 Machine Translation (by EPO and Google)—published Aug. 27, 2014 Wang Tian.
Authors: Alhomidi and Reed Title: Attack Graph-Based Risk Assessment and Optimisation Approach International Journal of Network Security & Its Applications (IJNSA), vol. 6, No. 3, May 2014.

\* cited by examiner

VALIDATING THE USE OF USER CREDENTIALS IN A PENETRATION TESTING CAMPAIGN

CROSS-REFERENCE TO RELATED APPLICATIONS

This patent application claims the benefit of U.S. Provisional Patent Application No. 62/844,776 filed on May 8, 2019, which is incorporated herein by reference in its entirety.

FIELD OF THE INVENTION

The present invention relates to systems and methods for penetration testing of networked systems, and for reliably determining whether given user credentials can be used to compromise a network node. In particular, the present invention is suitable for penetration testing of networked systems in which network nodes may be compromisable by using user credentials which provide the necessary access rights for compromising a network node.

BACKGROUND

There is currently a proliferation of organizational networked computing systems. Every type of organization, be it a commercial company, a university, a bank, a government agency or a hospital, heavily relies on one or more networks interconnecting multiple computing nodes. Failures of the networked computing system of an organization or even of only a portion of it might cause a significant damage, up to completely shutting down all operations. Additionally, all data of the organization exists somewhere on its networked computing system, including all confidential data comprising its "crown jewels" such as prices, details of customers, purchase orders, employees' salaries, technical formulas, etc. Loss of such data or leaks of such data to outside unauthorized entities might be disastrous for the organization.

As almost all organizational networks are connected to the Internet at least through one computing node, they are subject to attacks by computer hackers or by hostile adversaries. Quite often the newspapers are reporting incidents in which websites crashed, sensitive data was stolen or service to customers was denied, where the failures were the results of hostile penetration into an organization's networked computing system.

As a result, many organizations invest a lot of efforts and costs in preventive means designed to protect their computing networks against potential threats. There are many defensive products offered in the market claiming to provide protection against one or more known modes of attack, and many organizations arm themselves to the teeth with multiple products of this kind.

However, it is difficult to tell how effective such products really are in achieving their stated goals of blocking hostile attacks, and consequently most CISO's (Computer Information Security Officers) will admit (maybe only off the record), that they don't really know how well they can withstand an attack from a given adversary. The only way to really know how strong and secure a system is, is by trying to attack it as a real adversary would. This is known as red-teaming or penetration testing (pen testing, in short), and is a very common approach that is even required by regulation in some developed countries.

Penetration testing requires highly talented people to man the red team. Those people should be familiar with each and every publicly known vulnerability and attacking method and should also have a very good familiarity with networking techniques and multiple operating systems implementations. Such people are hard to find and therefore many organizations give up establishing their own red teams and resort to hiring external expert consultants for carrying out that role (or completely give up penetration testing). But external consultants are expensive and therefore are typically called in only for brief periods separated by long intervals in which no such testing is done. This makes the penetration testing ineffective as vulnerabilities caused by new attacks that appear almost daily are discovered only months after becoming serious threats to the organization.

Additionally, even rich organizations that can afford hiring talented experts as in-house red teams do not achieve good protection. Testing for vulnerabilities of a large network containing many types of computers, operating systems, network routers and other devices is both a very complex and a very tedious process. The process is prone to human errors of missing testing for certain threats or misinterpreting the damages of certain attacks. Also, because a process of full testing against all threats is quite long, the organization might again end with a too long discovery period after a new threat appears.

Because of the above difficulties several vendors are proposing automated penetration testing systems. Such systems automatically discover and report vulnerabilities of a networked system, potential damages that might be caused to the networked system, and potential trajectories of attack that may be employed by an attacker.

A penetration testing process involves at least the following main functions: (i) a reconnaissance function, (ii) an attack function, and (ii) a reporting function. The process may also include additional functions, for example a cleanup function that restores the tested networked system to its original state as it was before the test. In an automated penetration testing system, at least one of the above three functions is at least partially automated, and typically two or three of them are at least partially automated.

A reconnaissance function is the function within a penetration testing system that handles the collection of data about the tested networked system. The collected data may include internal data of networks nodes, data about network traffic within the tested networked system, business intelligence data of the organization owning the tested networked system, etc. The functionality of a reconnaissance function can be implemented, for example, by software executing in a server that is not one of the network nodes of the tested networked system, where the server probes the tested networked system for the purpose of collecting data about it.

An attack function is the function within a penetration testing system that handles the determination of whether security vulnerabilities exist in the tested networked system based on data collected by the reconnaissance function. The functionality of an attack function can be implemented, for example, by software executing in a server that is not one of the nodes of the tested networked system, where the server attempts to attack the tested networked system for the purpose of verifying that it can be compromised.

A reporting function is the function within a penetration testing system that handles the reporting of results of the penetration testing system. The functionality of a reporting function may be implemented, for example, by software executing in the same server that implements the functionality of the attack function, where the server reports the findings of the attack function to an administrator or a CISO of the tested networked system.

Penetration testing systems can be characterized as doing either an "actual attack penetration testing" or as doing a "simulated penetration testing".

An actual attack penetration testing system does its penetration testing by attempting to attack the tested networked system. Such a system accesses the tested networked system during the test and is not limiting itself to simulation or evaluation. This includes verifying that the tested networked system can be compromised by actively attempting to compromise it and then checking if it was indeed compromised. This implies that a possible side-effect of executing an actual attack penetration test might be the compromising of the tested networked system.

A simulated penetration testing system does its penetration testing while avoiding disturbance to the tested networked system and specifically while avoiding any risk of compromising it. This implies that whenever there is a need to verify that the tested networked system can be compromised by an operation or a sequence of operations, the verification is done by simulating the results of that operation or sequence of operations or by otherwise evaluating them, without taking the risk of compromising the tested networked system.

An actual attack penetration testing system operates by iteratively compromising network nodes of the tested networked system. At each iteration during the testing process some of the network nodes of the tested networked system are considered to be already compromised by the potential attacker, and the penetration testing system is attempting to compromise an additional network node (not yet compromised) by utilizing the already-compromised network nodes that are operating under the control of the attacker. Once an additional network node is compromised, it is added to the group of already-compromised network nodes and a new iteration of the testing begins.

A simulated penetration testing system operates by iteratively determining the compromisability of network nodes of the tested networked system. At each iteration during the testing process some of the network nodes of the tested networked system are considered to be already known to be compromisable by the potential attacker, and the penetration testing system is attempting to determine the compromisability of an additional network node (not yet known to be compromisable) by utilizing the already-known-to-be-compromisable network nodes that are assumed to operate under the control of the attacker. Once an additional network node is determined to be compromisable, it is added to the group of already-known-to-be-compromisable network nodes and a new iteration of the testing begins.

Each iteration of compromising a new network node or determining the compromisability of a new network node includes verifying the success of the compromising or the determining under current conditions in the tested networked system. As explained above, in actual attack penetration testing systems the verifying is achieved by actively attempting to compromise the new network node, while in simulated penetration testing systems the verifying is achieved by simulating or evaluating of the compromising step.

The Problem to Solve

One of the common steps performed by an attacker as part of compromising a networked system is a step that logs into a target network node using user credentials of a legitimate user, which user credentials were obtained as a result of a previous step by the attacker. For example, an attacker may obtain the user name and the password of a certain user by stealing a passwords file that includes them, or by trying a list of guessed passwords that are known to be commonly selected by uncareful users (after obtaining the user name by other means).

As for every iteration of a penetration testing campaign attempting to compromise a network node, an iteration which is attempting to compromise a new node by using user credentials for logging into the new node should also be validated for success.

Actual attack penetration testing systems that validate vulnerabilities by actually attacking the tested networked system face a problem in validating the ability of an attacker to log into a target network node using user credentials. Failure in one or more successive login attempts might cause the target node to lock and thus might change the state of the tested networked system. While actual attack penetration testing systems are expected to sometimes change the state of the tested networked system, this is acceptable as long as the penetration testing system can undo the state changes at the end of a penetration testing campaign. In the locking case, undoing the state change might not be possible.

A common solution adopted by actual attack penetration testing systems is to predict when a failing login attempt might cause locking, and when locking is possible—to avoid further attempts to login. For example, if a given service is known to use a protocol in which three login failures within two hours cause locking, the penetration testing system will wait for two hours after two successive failures before making another attempt. In another example, a Microsoft Active Directory service is the target of the logging-in attempt, and the penetration testing system makes use of the badPwdCount and badPasswordTime attributes of the service for deciding when a risk of locking exists. Unfortunately, it is not always possible to know the locking logic used by the target node, and consequently locking events may happen during actual-attack campaigns, even when using this solution.

Penetration testing systems that use simulation or other types of non-intruding evaluation for validating vulnerabilities during a campaign do not suffer from the locking problem. However, they still have to answer the question "are we sure that network node X is compromisable by logging into it using given credentials?".

Simulated penetration testing systems are not allowed to attempt to log into network nodes in order to answer the above question, at least because of the locking risk. Therefore, they usually operate under the assumption that once the credentials of a user (e.g. his/her username and password) are believed to be available to the attacker, the attacker can log into any network node to which that user has access rights. No further proof is required.

An example of applying the above assumption by a simulated reconnaissance agent penetration testing system (see the Definitions section for the definition of "reconnaissance agent penetration testing system") may operate as follows:

1. The penetration testing system concludes that the attacker can compromise node A and consequently can get full control of its operation.

2. The reconnaissance agent installed in node A detects a login operation event, which was done by user X. The detection may be done by looking for login events in the security events log of node A.

3. Once a log-in event occurred, it is expected that the RAM of node A contains an explicit (non-hashed) copy of the credentials of user X which were used for the logging-in operation. Therefore, a memory dump of node A is obtained by the agent of node A in response to detecting the logging-in event.

4. The credentials of user X can be identified in the memory dump and extracted out (there are open source tools that can do this task). This means that an attacker controlling node A could obtain the credentials of user X.

5. Once the credentials of user X are determined to be available to the attacker, it is assumed that the attacker could also take control of node B to which user X was determined to have access rights (e.g. it was determined that user X is included in the local admin list of node B), and consequently node B is concluded to be compromisable by the attacker.

However, the above method of determining compromisability of node B is not fully reliable, and in some cases may be too pessimistic. In the real world, the fact that user X, whose user credentials are known to the attacker, is included in the local admin list of node B (i.e. user X has access rights to node B using credentials known to the attacker), does not guarantee that the attacker can log into node B. This is so because it may be the case that node B is not currently reachable from node A (and from any other already-known-to-be-compromisable node). For example, node A (and all other already-known to-be-compromisable nodes) may be located in a first sub-network, while node B is located in a second sub-network. A router connecting the first and second sub-networks may currently be configured to block access from nodes of the first sub-network to nodes of the second sub-network. In other words, having theoretical access rights to a given node does not necessarily imply having actual access rights to the given node because the given node may not be accessible.

The implications of the above assumption are that in many cases the conclusions reached by a penetration testing campaign might be too pessimistic. The campaign may conclude that a specific node is compromisable by an attacker, but in reality, that node may be completely safe. Such too-pessimistic results might cause an organization to invest extensive efforts and precious resources in protecting segments of its networked system that do not really require protection.

It is possible to address the above problem by actually transmitting messages to the node in question and finding out if they reached their destination. For example, in a reconnaissance agent penetration testing system, the agents in all already-known-to-be-compromisable nodes may each send a test message addressed to the agent of node B. If the agent in node B receives one such test message, it reports this fact to the central server of the penetration testing system, which can then conclude that it is possible to compromise node B by using user credentials for logging into node B from the node from which the successful test message was received. However, this solution suffers from some drawbacks—it generates a lot of extra traffic in the tested networked system, which traffic may be between nodes that have no reason to communicate during normal operation. This is highly undesirable, as it might (i) interfere with the normal operation of the tested networked system, and (ii) trigger alerts from defensive security applications that will find such test messages to be unusual and therefore suspicious.

There is thus a need to find a way for a penetration testing system to validate the success of a logging-in operation using given user credentials that is both safe and fully reliable.

SUMMARY

A method is disclosed, according to embodiments of the present invention, for carrying out a penetration testing campaign in a networked system by a penetration testing system. Carrying out the penetration testing campaign is for determining a way for an attacker to compromise the networked system. The method comprises: (a) determining that the attacker can obtain user credentials of a first user; (b) determining that, when using the user credentials, the first user has access rights to a first network node of the networked system; (c) determining that a second network node of the networked system, different from the first network node, is compromisable by the attacker during the penetration testing campaign; (d) determining that the first network node was accessed from the second network node; (e) based on (i) the determining that the attacker can obtain the user credentials of the first user, (ii) the determining that, when using the user credentials, the first user has access rights to the first network node, (iii) the determining that the second network node is compromisable by the attacker, and (iv) the determining that the first network node was accessed from the second network node, determining that the first network node is compromisable by the attacker during the penetration testing campaign; (f) determining the way for the attacker to compromise the networked system, the way for the attacker to compromise the networked system including a step of compromising the first network node using the user credentials of the first user; and (g) reporting the determined way for the attacker to compromise the networked system, the reporting comprising at least one operation selected from the group consisting of (i) causing a display device to display a report including information about the determined way to compromise the networked system, (ii) recording the report including the information about the determined way to compromise the networked system in a file, and (iii) electronically transmitting the report including the information about the determined way to compromise the networked system.

In some embodiments, the determining that the attacker can obtain the user credentials of the first user can comprise determining that the attacker can obtain a passwords file which contains the user credentials of the first user.

In some embodiments, the determining that the attacker can obtain the user credentials of the first user can comprise determining that, subsequent to the first user logging into a third network node of the networked system which is already known to be compromisable by the attacker, the attacker can extract the user credentials of the first user from a memory dump of the third network node.

In some embodiments, the determining that the attacker can obtain the user credentials of the first user can comprise determining that the attacker can obtain a password of the first user by trying multiple guessed passwords that are known to be commonly used as passwords by users.

In some embodiments, the determining that, when using the user credentials, the first user has access rights to the first network node can comprise determining that the first user is included in a list of local administrators of the first network node.

In some embodiments, the determining that, when using the user credentials, the first user has access rights to the first network node can comprise determining that the first user had logged into the first network node.

In some embodiments, the determining that the first network node was accessed from the second network node can comprise (i) extracting, from a memory dump of the first network node, a network address from which the first network node was accessed and (ii) identifying the network address to be associated with the second network node.

In some embodiments, the determining that the first network node was accessed from the second network node can be done during the carrying out of the penetration testing campaign.

In some embodiments, the determining that the first network node was accessed from the second network node can be carried out prior to the carrying out of the penetration testing campaign.

In some embodiments, the determining that the first network node was accessed from the second network node can comprise determining that the first network node was accessed from the second network node using user credentials of a second user that is different from the first user.

In some embodiments, the determining that the first network node was accessed from the second network node can comprise determining that the first network node was accessed from the second network node using the user credentials of the first user.

In some embodiments, the determining that the first network node was accessed from the second network node can comprise determining that a file in a shared folder in the first network node was read by the second network node.

In some embodiments, the penetration testing system can comprise a reconnaissance agent software module that is installed on at least some of the network nodes of the networked system, and the determining that the attacker can obtain user credentials of the first user can be done, at least in part, by executing the reconnaissance agent software module in one of the network nodes of the networked system.

In some embodiments, the penetration testing system can comprise a reconnaissance agent software module that is installed on at least some of the network nodes of the networked system, and the determining that the first user has access rights to the first network node can be done, at least in part, by executing the reconnaissance agent software module in the first network node.

In some embodiments, the penetration testing system can comprise a reconnaissance agent software module that is installed on at least some of the network nodes of the networked system, and the determining that the first network node was accessed from the second network node can be done, at least in part, by executing the reconnaissance agent software module in the first network node.

In some embodiments, the method can further comprise: (h) determining that the attacker can obtain second user credentials of a second user; (i) determining that, when using the second user credentials, the second user has access rights to a third network node of the networked system; (j) during a monitoring time interval, failing to detect the third network node being accessed from a network node that is already known to be compromisable; and (k) based on the failing to detect the third network node being accessed from a network node that is already known to be compromisable, concluding that the third network node is not compromisable by the attacker using the second user credentials during the penetration testing campaign.

In some embodiments, the method can further comprise: (h) determining that the attacker can obtain second user credentials of a second user; (i) determining that, when using the second user credentials, the second user has access rights to a third network node of the networked system; (j) during a monitoring time interval, failing to detect the third network node being accessed from a network node that is already known to be compromisable; (k) determining a second way for the attacker to compromise the networked system, the second way for the attacker to compromise the networked system including a step of compromising the third network node using the second user credentials of the second user; and (l) reporting the determined second way for the attacker to compromise the networked system, wherein the determined way for the attacker to compromise the networked system is reported as more important than the determined second way for the attacker to compromise the networked system.

In some embodiments, the method can further comprise: (h) determining that the attacker can obtain second user credentials of a second user; (i) determining that, when using the second user credentials, the second user has access rights to a third network node of the networked system; (j) during a monitoring time interval, failing to detect the third network node being accessed from a network node that is already known to be compromisable; (k) determining a second way for the attacker to compromise the networked system, the second way for the attacker to compromise the networked system including a step of compromising the third network node using the second user credentials of the second user; and (l) providing recommendations for blocking both the determined way for the attacker to compromise the networked system and the determined second way for the attacker to compromise the networked system, wherein the recommendation for blocking the determined way is given a higher priority than the recommendation for blocking the determined second way.

A penetration testing system is disclosed, according to embodiments of the present invention, for carrying out a penetration testing campaign in a networked system. Carrying out the penetration testing campaign is for determining a way for an attacker to compromise the networked system. The system comprises: (a) a remote computing device comprising a computer memory and one or more processors, the remote computing device in electronic communication with at least some network nodes of the networked system; and (b) a penetration-testing non-transitory computer-readable storage medium having stored therein program instructions of a penetration testing software module, which when executed by the one or more processors of the remote computing device cause the one or more processors of the remote computing device to carry out the following steps: (i) determining that the attacker can obtain user credentials of a first user, wherein the determining that the attacker can obtain user credentials of the first user comprises one of (A) concluding that the attacker can obtain user credentials of the first user and (B) receiving, from a network node of the networked system, information about a determination that the attacker can obtain user credentials of the first user, (ii) determining that, when using the user credentials, the first user has access rights to a first network node of the networked system, wherein the determining that when using the user credentials, the first user has access rights to the first network node of the networked system comprises one of (A) concluding that when using the user credentials, the first user has access rights to the first network node of the networked system, and (B) receiving, from a network node of the networked system, information about a determination that when using the user credentials, the first user has access rights to the first network node of the networked system, (iii) determining that a second network node of the networked system, different from the first network node, is compromisable by the attacker during the penetration testing campaign, (iv) determining that the first network node was accessed from the second network node, wherein the determining that the first network node was accessed from the second network node comprises one of (A) concluding that the first network node was accessed from the second network node and (B) receiving, from a network node of the networked system, information about a determination that the first network node was accessed from the second network node, (v) based on (A) the determining that the attacker can obtain the user credentials of the first user, (B) the determining that, when using the user credentials, the first user has access rights to the first network node, (C) the determining that the second network node is compromisable by the attacker, and (D) the determining that the first network node was accessed from the second network node, determining that the first network node is compromisable by the attacker during the penetration testing campaign, (vi) determining the way for the attacker to compromise the networked system, the way for the attacker to compromise the networked system including a step of compromising the first network node using the user credentials of the first user, and (vii) reporting the determined way for the attacker to compromise the networked system, the reporting comprising at least one operation selected from the group consisting of (A) causing a display device to display a report including information about the determined way to compromise the networked system, (B) recording the report including the information about the determined way to compromise the networked system in a file, and (C) electronically transmitting the report including the information about the determined way to compromise the networked system.

A method is disclosed, according to embodiments of the present invention, for carrying out a penetration testing campaign in a networked system by a penetration testing system. Carrying out the penetration testing campaign is for determining a way for an attacker to compromise the networked system. The method comprises: (a) obtaining user credentials of a first user; (b) determining that, when using the user credentials, the first user has access rights to a first network node of the networked system; (c) during the penetration testing campaign, compromising a second network node of the networked system, the second network node being different from the first network node; (d) determining that the first network node was accessed from the second network node; (e) based on (i) the obtaining of the user credentials of the first user, (ii) the determining that, when using the user credentials, the first user has access rights to the first network node, (iii) the compromising of the second network node, and (iv) the determining that the first network node was accessed from the second network node, determining that the first network node is compromisable by the attacker during the penetration testing campaign without compromising the first network node during the penetration testing campaign; (f) determining the way for the attacker to compromise the networked system, the way for the attacker to compromise the networked system including a step of compromising the first network node using the user credentials of the first user; and (g) reporting the determined way for the attacker to compromise the networked system, the reporting comprising at least one operation selected from the group consisting of (i) causing a display device to display a report including information about the determined way to compromise the networked system, (ii) recording the report including the information about the determined way to compromise the networked system in a file, and (iii) electronically transmitting the report including the information about the determined way to compromise the networked system.

In some embodiments, the obtaining of the user credentials of the first user can comprise obtaining a passwords file which contains the user credentials of the first user.

In some embodiments, the obtaining of the user credentials of the first user can comprise, subsequent to the first user logging into a third network node of the networked system which is already known to be compromisable by the attacker, extracting the user credentials of the first user from a memory dump of the third network node.

In some embodiments, the obtaining of the user credentials of the first user can comprise trying multiple guessed passwords that are known to be commonly used as passwords by users.

In some embodiments, the determining that, when using the user credentials, the first user has access rights to the first network node comprises determining that the first user is included in a list of local administrators of the first network node.

In some embodiments, the determining that, when using the user credentials, the first user has access rights to the first network node can comprise determining that the first user had logged into the first network node.

In some embodiments, the determining that the first network node was accessed from the second network node can comprise (i) extracting from a memory dump of the first network node a network address from which the first network node was accessed and (ii) identifying the network address to be associated with the second network node.

In some embodiments, the determining that the first network node was accessed from the second network node can be done during the carrying out of the penetration testing campaign.

In some embodiments, the determining that the first network node was accessed from the second network node can be carried out prior to the carrying out of the penetration testing campaign.

In some embodiments, the determining that the first network node was accessed from the second network node can comprise determining that the first network node was accessed from the second network node using user credentials of a second user that is different from the first user.

In some embodiments, the determining that the first network node was accessed from the second network node can comprise determining that the first network node was accessed from the second network node using the user credentials of the first user.

In some embodiments, the determining that the first network node was accessed from the second network node can comprise determining that a file in a shared folder in the first network node was read by the second network node.

In some embodiments, the penetration testing system can comprise a reconnaissance agent software module that is installed on at least some of the network nodes of the networked system, and the obtaining of the user credentials of the first user can be done, at least in part, by executing the reconnaissance agent software module in one of the network nodes of the networked system.

In some embodiments, the penetration testing system can comprise a reconnaissance agent software module that is installed on at least some of the network nodes of the networked system, and the determining that the first user has access rights to the first network node can be done, at least in part, by executing the reconnaissance agent software module in the first network node.

In some embodiments, the penetration testing system can comprise a reconnaissance agent software module that is installed on at least some of the network nodes of the networked system, and the determining that the first network node was accessed from the second network node can be done, at least in part, by executing the reconnaissance agent software module in the first network node.

In some embodiments, the method can further comprise: (h) obtaining second user credentials of a second user; (i) determining that, when using the second user credentials, the second user has access rights to a third network node of the networked system; (j) during a monitoring time interval, failing to detect that the third network node was accessed from a network node that is already known to be compromisable; and (k) based on the failing to detect the third network node being accessed from a network node that is already known to be compromisable, concluding that the third network node is not compromisable by the attacker using the second user credentials during the penetration testing campaign.

In some embodiments, the method can further comprise: (h) obtaining second user credentials of a second user; (i) determining that, when using the second user credentials, the second user has access rights to a third network node of the networked system; (j) during a monitoring time interval, failing to detect the third network node being accessed from a network node that is already known to be compromisable; (k) determining a second way for the attacker to compromise the networked system, the second way for the attacker to compromise the networked system including a step of compromising the third network node using the second user credentials of the second user; and (l) reporting the determined second way for the attacker to compromise the networked system, wherein the determined way for the attacker to compromise the networked system is reported as more important than the determined second way for the attacker to compromise the networked system.

In some embodiments, the method can further comprise: (h) obtaining second user credentials of a second user; (i) determining that, when using the second user credentials, the second user has access rights to a third network node of the networked system; (j) during a monitoring time interval, failing to detect the third network node being accessed from a network node that is already known to be compromisable; (k) determining a second way for the attacker to compromise the networked system, the second way for the attacker to compromise the networked system including a step of compromising the third network node using the second user credentials of the second user; and (l) providing recommendations for blocking both the determined way for the attacker to compromise the networked system and the determined second way for the attacker to compromise the networked system, wherein the recommendation for blocking the determined way is given a higher priority than the recommendation for blocking the determined second way.

A penetration testing system is disclosed, according to embodiments of the present invention, for carrying out a penetration testing campaign in a networked system. Carrying out the penetration testing campaign is for determining a way for an attacker to compromise the networked system. The system comprises: (a) a remote computing device comprising a computer memory and one or more processors, the remote computing device in electronic communication with at least some network nodes of the networked system; and (b) a penetration-testing non-transitory computer-readable storage medium having stored therein program instructions of a penetration testing software module, which when executed by the one or more processors of the remote computing device cause the one or more processors of the remote computing device to carry out the following steps: (i) obtaining user credentials of a first user, (ii) determining that, when using the user credentials, the first user has access rights to a first network node of the networked system, wherein the determining that when using the user credentials, the first user has access rights to the first network node of the networked system comprises one of (A) concluding that when using the user credentials, the first user has access rights to the first network node of the networked system, and (B) receiving, from a network node of the networked system, information about a determination that when using the user credentials, the first user has access rights to the first network node of the networked system, (iii) during the penetration testing campaign, compromising a second network node of the networked system, the second network node being different from the first network node, (iv) determining that the first network node was accessed from the second network node, wherein the determining that the first network node was accessed from the second network node comprises one of (A) concluding that the first network node was accessed from the second network node and (B) receiving, from a network node of the networked system, information about a determination that the first network node was accessed from the second network node, (v) based on (A) the obtaining of the user credentials of the first user, (B) the determining that, when using the user credentials, the first user has access rights to the first network node, (C) the compromising of the second network node, and (D) the determining that the first network node was accessed from the second network node, determining that the first network node is compromisable by the attacker during the penetration testing campaign, (vi) determining the way for the attacker to compromise the networked system, the way for the attacker to compromise the networked system including a step of compromising the first network node using the user credentials of the first user, and (vii) reporting the determined way for the attacker to compromise the networked system, the reporting comprising at least one operation selected from the group consisting of (A) causing a display device to display a report including information about the determined way to compromise the networked system, (B) recording the report including the information about the determined way to compromise the networked system in a file, and (C) electronically transmitting the report including the information about the determined way to compromise the networked system.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings.

DETAILED DESCRIPTION OF THE EMBODIMENTS

Note: Throughout this disclosure, subscripted reference numbers (e.g., $10_1$) or letter-modified reference numbers (e.g., 100a) may be used to designate multiple separate appearances of elements in a single drawing, e.g. $10_1$ is a single appearance (out of a plurality of appearances) of element 10, and likewise 100a is a single appearance (out of a plurality of appearances) of element 100.

Figure 1:
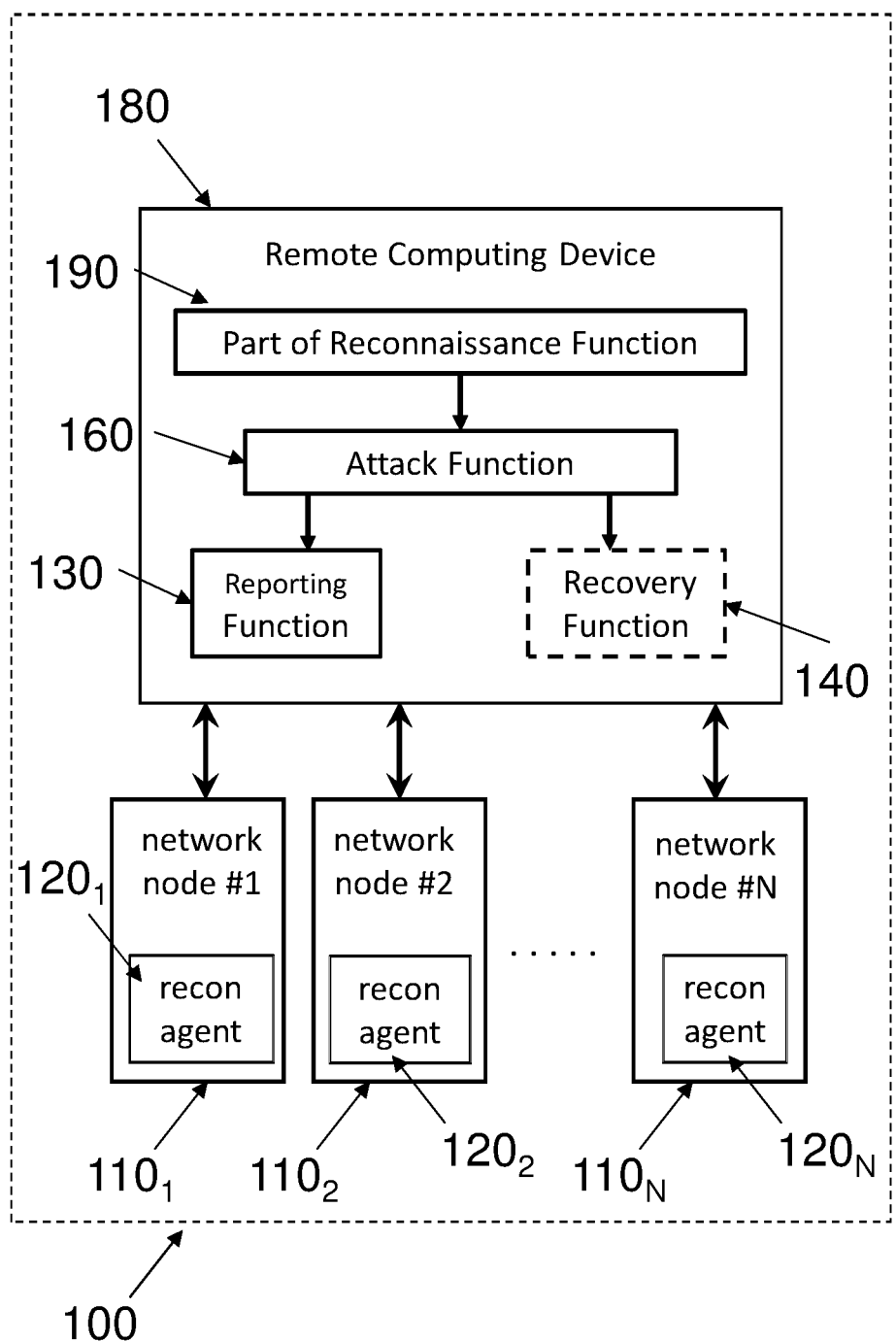
FIG. 1 is a functional block diagram of a reconnaissance agent penetration testing system which may employ embodiments of the present invention.

Referring now to the figures, and in particular to FIG. 1, a functional block diagram of a penetration testing system 100 is shown according to some embodiments, comprising a reconnaissance function as defined as definition "14" in the Definitions Section later in this specification. The reconnaissance function includes functionality in reconnaissance agents 120 ($120_1$, $120_2$, . . . $120_N$) installed in respective network nodes 110 ($110_1$, $110_2$, . . . $110_N$) and, in some embodiments, also includes functionality in a remote computing device 180 in which is installed "part of reconnaissance function" 190. In some embodiments, an attack function 160, as defined as definition "15" in the Definitions Section, a reporting function 130 as defined as definition "16" in the Definitions Section, and optionally a recovery function 140 (also known in the industry as a 'clean-up' function and synonymous therewith), as defined as definition "17" in the Definitions Section, are all installed in the remote computing device 180. As explained in definition "15", an 'attack function' forms part of the architecture of every penetration testing system and performs the function of determining whether one or more security vulnerabilities exist in the tested networked system. In an alternative embodiment (NOT SHOWN), one or more network nodes of the tested networked system act as the remote computing device, so that any or all of the above-listed functions are installed in network nodes 110 instead of in a physically-remote remote computing device 180, or, alternatively, the functionality of the remote computing device 180 of FIG. 1 is split between the physically-remote remote computing device 180 and the network nodes 110.

A reconnaissance agent, or a reconnaissance client agent, which is synonymous therewith, is a software module designed to be installed in nodes of the tested networked system. A reconnaissance client agent is able to communicate with a remote computing device hosting a penetration testing software module responsible, among other things, for managing and conducting the penetration testing process. A reconnaissance client agent can report, to the penetration testing software module when installed on the remote computing device, data extracted by the agent from its hosting node.

Figure 2:
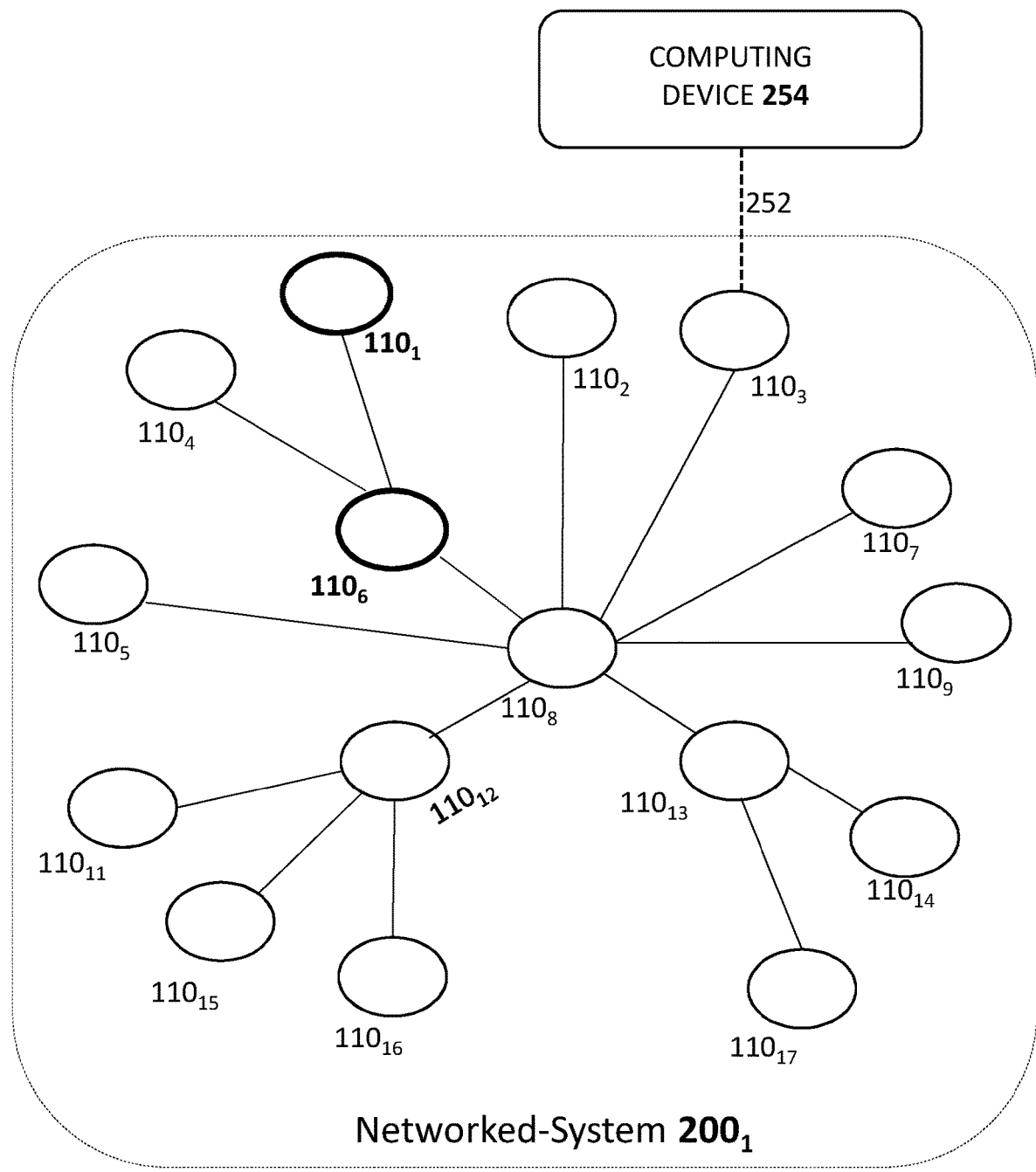
FIGS. 2, 3A and 3B show schematic illustrations of networked systems that may be tested according to embodiments of the present invention.

Referring now to FIG. 2, a remote computing device 254 of a penetration testing system 100 is in communication (via communications link 252) with a plurality of networked nodes 110 of networked system $200_1$. Communications link 252 can include any combination of wired and wireless technologies; in some embodiments link 252 can be an Internet connection and remote computing device 254 can be a general-purpose computer server located at a data center or shared server location, for example 'in the cloud.' The number of network nodes 110 can be as few as two and as many as several hundred or several thousand. They can be connected hierarchically, peer-to-peer, hub-and-spoke, or in any combination of connections as long as each networked node 110 is connected to at least one other node 110. The seemingly direct connection of remote computer 254 with Node $110_3$ shown in FIG. 2 is for convenient illustration purposes only, and any communications link described herein can be made, as is known in the art, with one or more network nodes, with a router or gateway, in any other networking configuration that facilitates direct or indirect communication with each of the respective nodes 110 in networked system $200_1$. The physical location of remote computing device 254 is unimportant. It can be, by way of non-limiting examples, at a physical location belonging to a supplier or operator of a penetration testing system, in a 'cloud' server farm of an Internet services or cloud services provider, or it can be physically co-located with some or all of the network nodes 110.

A penetration testing system of the present invention, according to embodiments, can achieve certainty in concluding that a node can be compromised using user credentials, without risking the correct operation of the tested networked system.

In embodiments, this is achieved by adding a second requirement for concluding that a given node can be compromised by using user credentials, on top of the basic requirement that the credentials of a user which has access rights to the given node are available to the attacker. The additional requirement is that a login operation into the given node from an already-known-to-be-compromisable node has been found to occur. This additional requirement proves that the given node is reachable from at least one node that is already known to be compromisable. If both requirements are satisfied, then it can be concluded with certainty, e.g., by a penetration testing system, that the attacker could compromise the given node using the user credentials.

A first non-limiting example of applying the second requirement of concluding that a given node can be compromised by using user credentials, by a reconnaissance agent penetration testing system, may operate as follows:

1. The penetration testing system concludes that the attacker can compromise node $110_6$ (of FIG. 2) and consequently can get full control of its operation.

2. The reconnaissance agent installed in node $110_6$ detects a login operation event, which was done by user X. The detection may be done by looking for login events in the security events log of node $110_6$.

3. Once a login event occurs, it is expected that the RAM of node $110_6$ contains an explicit (non-hashed) copy of the credentials of user X which were used for the logging-in operation. Therefore, a memory dump is obtained by the agent of node $110_6$ in response to detecting the logging-in event.

4. The credentials of user X can be identified in the dump and extracted out, e.g., using open source tools that can do this task. This means that an attacker controlling node $110_6$ could obtain the credentials of user X.

5. It is determined that user X has access rights to node $110_1$ (e.g. it is determined by the agent installed in node $110_1$ that user X is included in the local admin list of node $110_1$). Note: nodes $110_1$ and $110_6$ are shown as neighboring each other and in direct node-to-node communication in FIG. 2, but this is merely illustrative and the methods described herein are also applicable in equal measure to nodes that are not in direct node-to-node communications with each other.

6. The reconnaissance agent of node $110_1$ looks for login operation events done using the credentials of user X. The detection may be done by looking for login events in the security events log of node $110_1$, obtaining a memory dump and extracting from it the credentials being used in the login operation.

7. When a login operation using the credentials of user X is detected in node $110_1$, the agent of node $110_1$ determines the IP address from which the login operation was made.

8. If the determined IP address corresponds to a node that is already known to be compromisable (whether node $110_6$ or another node), it is concluded that node $110_1$ can be compromised by the attacker using the user credentials of user X. This is concluded with certainty, since we know that (i) following the compromising of node $110_6$, the attacker could obtain the credentials of user X, which has access rights to node $110_1$, and (ii) once the credentials are known to the attacker, he could cause an already-compromised node, which is known with certainty to be able to reach node $110_1$, to log into node $110_1$.

It should be noted that the use of the security events log for detecting login events is just an example. In some implementations the agent (in node $110_6$, in node $110_1$ or in both nodes) may skip the inspection of the security events log and inspect a memory dump without knowing for sure that a login event occurred. The inspection may be done periodically, when receiving a command to do so from the central server of the penetration testing system, or both. Other implementations are also possible.

It should be noted that the above is just one illustrative and non-limiting example of implementing the principles of the proposed solution and other implementations are also possible. For example, while in step 6 of the above example the reconnaissance agent of node $110_1$ looks for login operation events done using the credentials of user X, in other implementations the reconnaissance agent of node $110_1$ looks for login operations using any user credentials and not only those of user X. When any login operation is detected in node $110_1$, its IP address is determined (as in step 7 above) and the flow continues as in the above example. In other words, it is not really essential that the proof of having connectivity from an already-known-to-be-compromisable node to node $110_1$ should be obtained based on a login operation by user X—any login operation from an already-known-to-be-compromisable node into node $110_1$ can provide the proof, regardless of whose credentials are being used.

Furthermore, it is not even necessary to look for login operations. In some implementations the observed occurrence of other operations can be a proof that proves the ability of another node to access node $110_1$. For example, the reconnaissance agent of node $110_1$ may look for operations that read from a shared folder in node $110_1$, which constitute a proof of accessibility.

It should be noted that the proposed solution is not guaranteed to always provide certainty. For example, the agent of node $110_1$ may not detect a login operation by user X because it so happened that user X did not log into node $110_1$ during the time period of running the current penetration testing campaign, even though user X frequently does log into node $110_1$. In other words, the lack of evidence of user X logging into node $110_1$ does not prove that user X never does that. In another example, the agent of node $110_1$ detects one or more login operations by user X, but each such operation is done from a corresponding node 110 that is not yet known to be compromisable at the time of that login operation. Here again, the detected events do not prove that user X never logs in from nodes that are compromisable. In yet another example, the lack of detection of a login operation by user X may be the result of a failure by the agent to detect some login operations, even though in reality user X did log into node $110_1$.

As a result of the above, a penetration testing system making use of the proposed solution should be careful to distinguish between cases in which there is certainty regarding the ability of the attacker to compromise a given network node by using user credentials and between cases in which there is no such certainty, even though it is still possible or even likely that the attacker can compromise the given node.

In some embodiments, cases in which there is no certainty of compromisability are treated as not being compromisable. In other words, in the above example if the agent of node $110_1$ did not detect a login operation by user X from an already-known-to-be-compromisable node, then node $110_1$ is assumed to be non-compromisable by using credentials of user X.

In some embodiments, cases in which there is no certainty of compromisability are still treated as being compromisable but have a "lower quality" of compromisability. For example, if the penetration testing system finds two paths of attack by which an attacker could reach an important asset of the tested networked system, one relying on compromising a node by credentials with certainty and the other relying on compromising a node by credentials without certainty, then the penetration testing system considers the first path of attack to be more important than the other one. This will affect the order in which the two paths of attack are reported to the user, the priority of remediation recommendations proposed to the user, etc. If, however, only a single path of attack is found by the penetration testing system, and this single path of attack is relying on compromising a node by credentials without having certainty, then in spite of the uncertainty, the penetration testing system reports the tested networked system to be compromisable and provides remediation recommendations for blocking the single path of attack that was found.

In some embodiments, cases in which there is no certainty of compromisability are considered as being only "possibly compromisable". For example, if the penetration testing system finds two paths of attack by which an attacker can reach an important asset of the tested networked system, one relying on compromising a node by credentials with certainty and the other relying on compromising a node by credentials without certainty, then the penetration testing system considers the first path of attack to be a "certain path of attack" and the second path of attack to be "a possible path of attack". The reports to the user clearly distinguish between the two levels of certainty, so the user is aware of the fact that the second path of attack is only an unproved possibility.

In some embodiments, the penetration testing system distinguishes between different levels of uncertainty. In an example, a first scenario in which user X was not found to log into a given node is treated differently from a second scenario in which user X was found to log into the given node, when all such login operations were done from not-yet-compromisable nodes. In one possible implementation, in the first scenario the given node is assumed to be non-compromisable (because it is reasonable to assume that user X never logs into the given node), while in the second scenario the given node is assumed to be compromisable (because it is reasonable to assume that sooner or later user X will log into the given node from a compromisable node).

In another possible implementation of the above example, in the first scenario the given node is assumed to be compromisable with "lower quality" of compromisability, while in the second scenario the given node is assumed to be compromisable with "higher quality" of compromisability. The difference between the two may affect the order by which paths of attack are reported to the user, the priority of remediation recommendations proposed to the user, etc.

In still another possible implementation of the above example, in the first scenario the given node is assumed to be "possibly compromisable", while in the second scenario the given node is assumed to be compromisable with certainty. The difference between the two may be explicitly made visible to the user when reporting the results of the penetration testing campaign.

The foregoing discussion was given in the context of simulated penetration testing systems. However, the proposed solution is also applicable for actual attack penetration testing systems, as is further explained hereinbelow and with respect to FIGS. 12A-19.

Components of a penetration testing system 100 according to some embodiments are illustrated in FIGS. 3A, 3B, 4A and 4B. The penetration testing system 100 itself comprises computing device 254, which comprises one or more processors 250, and non-transitory computer-readable storage medium 182. The storage medium 182 is shown for convenience in FIG. 3A as being part of the remote computing device 254 but it can be anywhere as long as the one or more processors 250 can access and execute the program instructions 185 stored therein. First network node $110_X$ of networked system $200_2$ is in electronic communication with computing device 254 (by communications arrangement $252_X$ which can be an Internet connection or a LAN connection or any other suitable connection, including an indirect connection). Second network node $110_Y$ is also in electronic communication with computing device 254 (by communications arrangement $252_Y$ which can be the same as communications arrangement $252_X$ or separate and/or different).

Figure 3A:
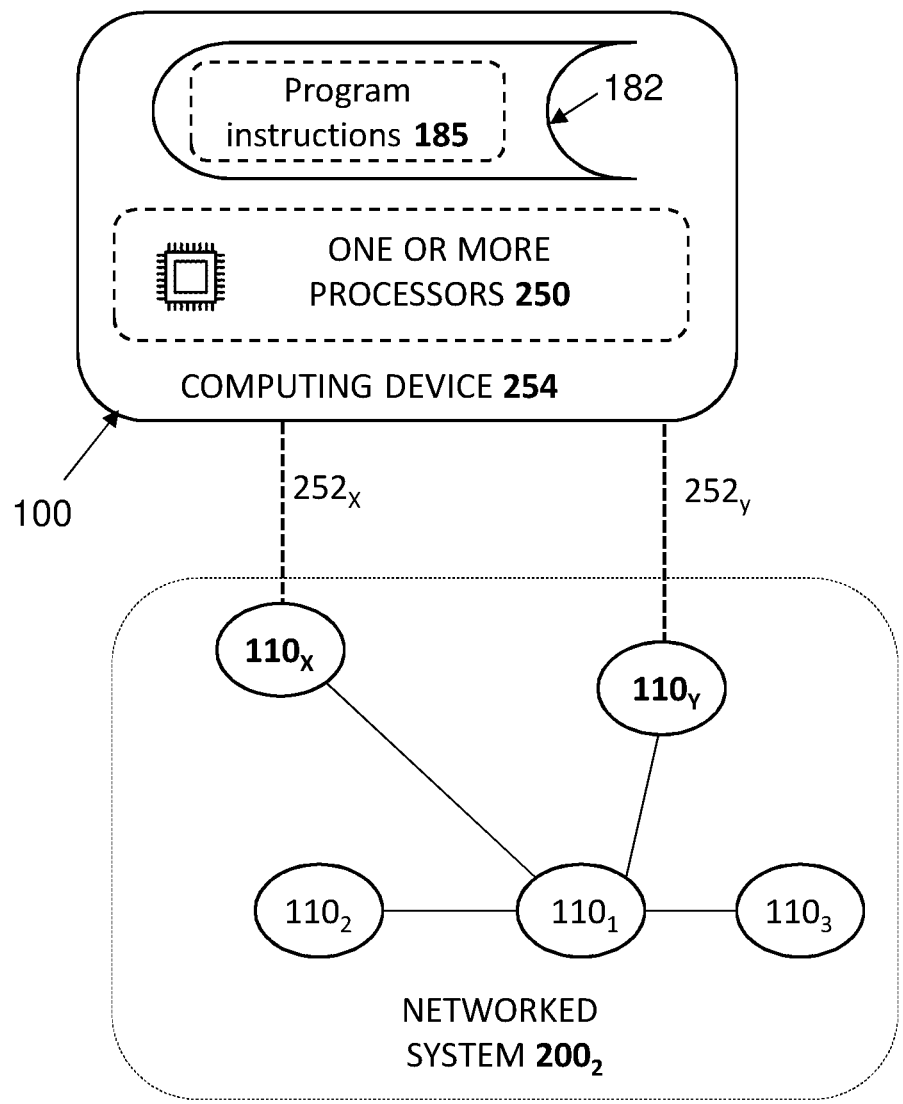
Figure 3B:
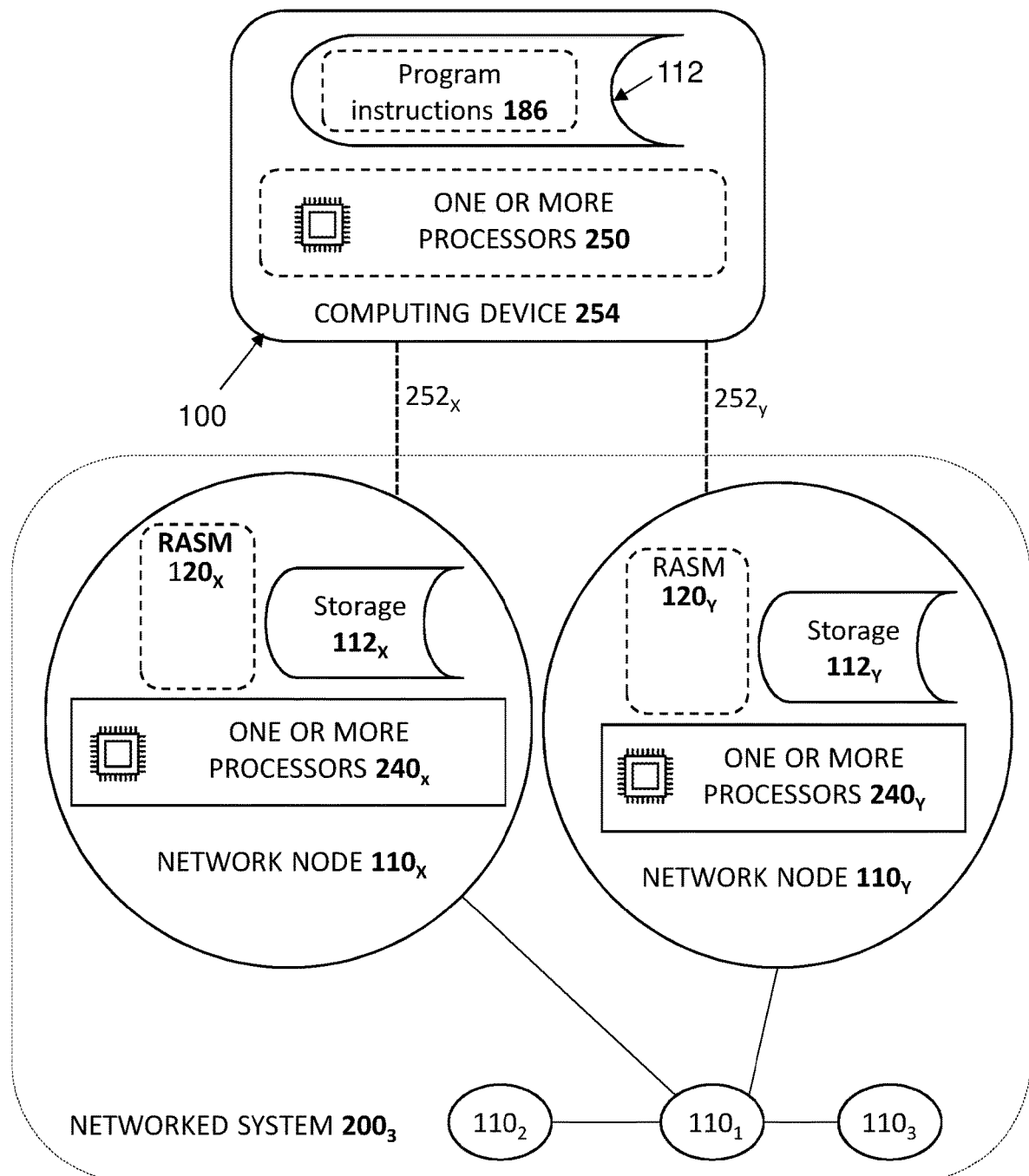

In some embodiments, the penetration testing system 100 additionally comprises reconnaissance agent software modules 120, as illustrated in FIG. 3B.

FIG. 3B is similar to the diagram of networked system $200_2$ of FIG. 3A, except that reconnaissance agent software modules $120_X$, $120_Y$ are installed in first and second network nodes $110_X$, $110_Y$. As disclosed earlier, the Reconnaissance Agent Software Module (RASM) 120 can be installed in any or all of the network nodes 110. The RASMs 120, or at least some program instructions thereof, can be stored in respective storage media 112 of corresponding network nodes 110.

In FIG. 3B, reconnaissance-agent non-transitory computer-readable storage medium $112_X$ is associated with a first node $110_X$ and is provided for storage of instructions (not shown) of the reconnaissance agent software module for execution by one or more processors $240_X$ of the first network node $110_X$, which is in electronic communication with a computing device 254 (by communications arrangement $252_X$ which can be an Internet connection or a LAN connection or any other suitable connection, including an indirect connection). Storage medium $112_X$ is shown for convenience as being part of the network node $110_X$ but it can be anywhere as long as the one or more processors $240_X$ can access and execute the instructions stored therein. Similarly, reconnaissance-agent non-transitory computer-readable storage medium $112_Y$ is associated with the second node $110_Y$ and is provided for storage of instructions (not shown) of the reconnaissance agent software module for execution by one or more processors $240_Y$ of the second network node $110_Y$, which is also in electronic communication with the computing device 254 (by communications arrangement $252_Y$ which can be the same as communications arrangement $252_X$ or separate and/or different). Storage medium $112_Y$ is also shown for convenience as being part of the network node $110_Y$ but it can be anywhere as long as the one or more processors $240_Y$ can access and execute the instructions stored therein.

Figure 4A:
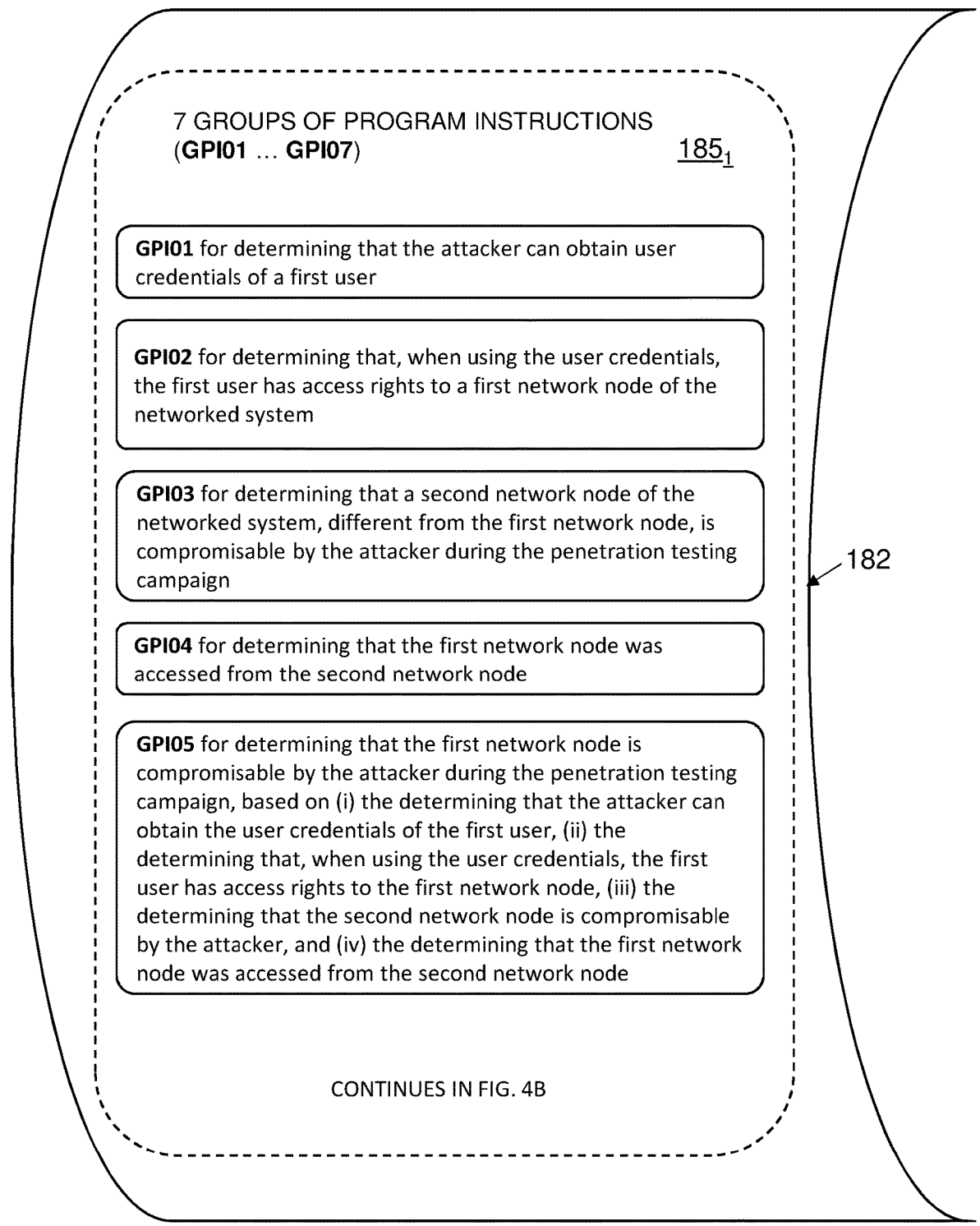
FIGS. 4A and 4B together show a block diagram of a non-transitory computer-readable storage medium comprising respective program instructions according to embodiments of the present invention.
Figure 4B:
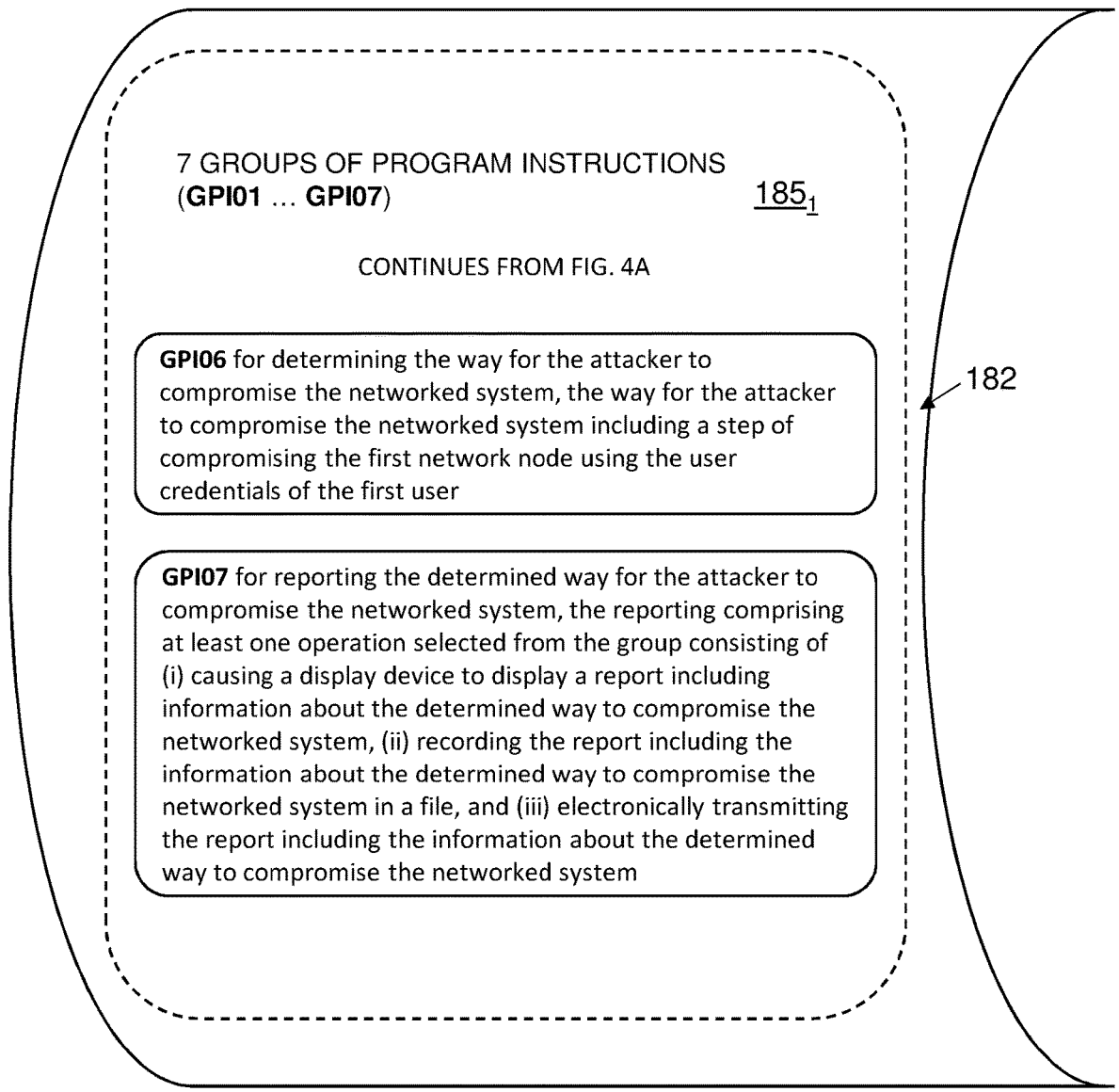

As illustrated in the block diagram of FIGS. 4A and 4B, storage medium 182 includes program instructions 185, which include 7 groups of program instructions GPI01 ... GPI07. Execution of the program instructions 185 by the one or more processors 250 of the computing device 254 causes the one or more processors 250 of the computing device 254 to execute the following groups of program instructions:

GPI01 for determining that the attacker can obtain user credentials of a first user;

GPI02 for determining that, when using the user credentials, the first user has access rights to a first network node of the networked system;

GPI03 for determining that a second network node of the networked system, different from the first network node, is compromisable by the attacker during the penetration testing campaign;

GPI04 for determining that the first network node was accessed from the second network node;

GPI05 for determining that the first network node is compromisable by the attacker during the penetration testing campaign, based on (i) the determining that the attacker can obtain the user credentials of the first user, (ii) the determining that, when using the user credentials, the first user has access rights to the first network node, (iii) the determining that the second network node is compromisable by the attacker, and (iv) the determining that the first network node was accessed from the second network node;

GPI06 for determining the way for the attacker to compromise the networked system, the way for the attacker to compromise the networked system including a step of compromising the first network node using the user credentials of the first user; and GPI07 for reporting the determined way for the attacker to compromise the networked system, the reporting comprising at least one operation selected from the group consisting of (i) causing a display device to display a report including information about the determined way to compromise the networked system, (ii) recording the report including the information about the determined way to compromise the networked system in a file, and (iii) electronically transmitting the report including the information about the determined way to compromise the networked system.

Figure 5:
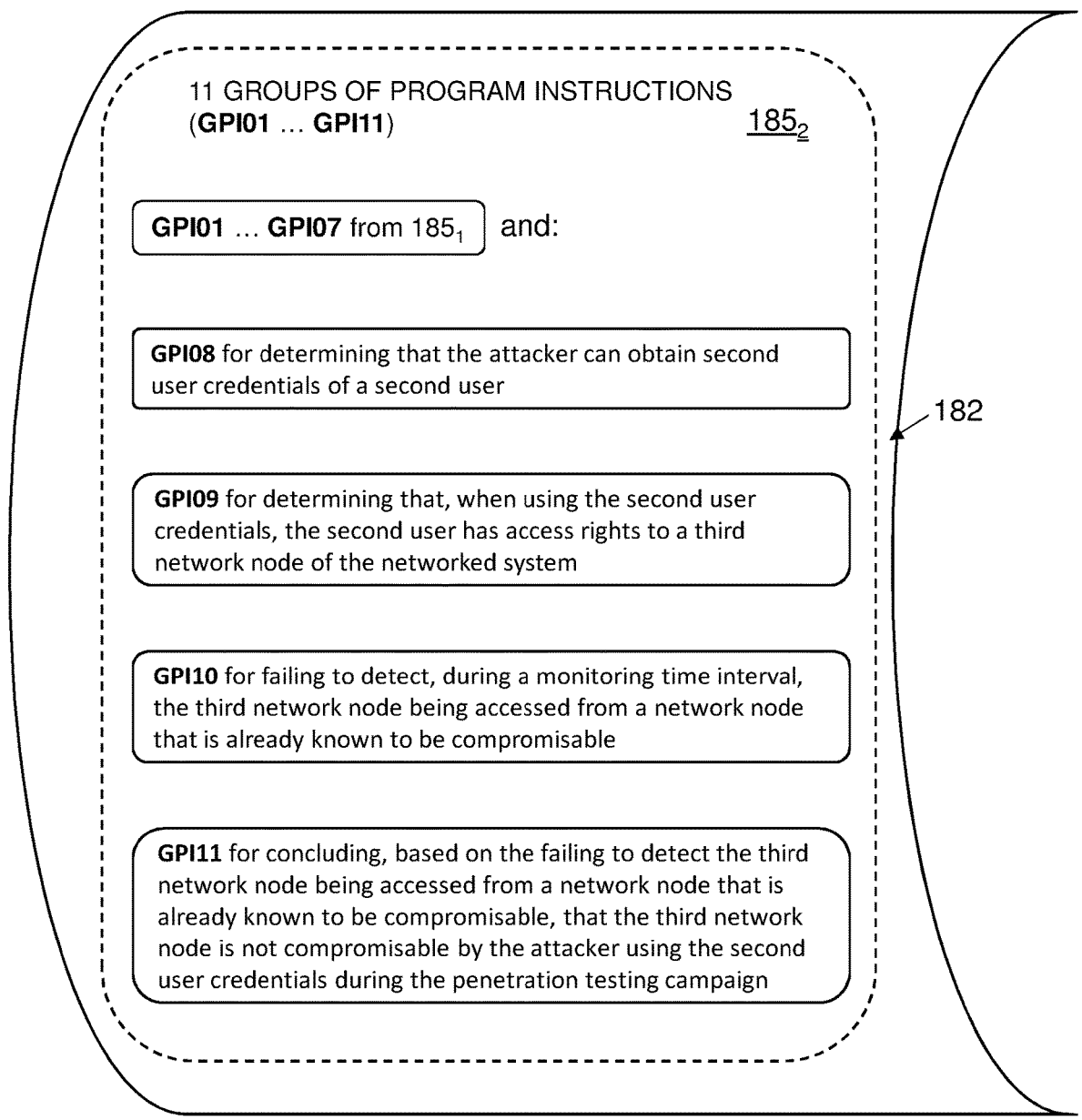
FIGS. 5, 6 and 7 show respective additional groups of program instructions which can be optionally stored in the non-transitory computer-readable storage medium of FIGS. 4A and 4B according to embodiments of the present invention.

In some embodiments, as illustrated in FIG. 5, program instructions 185 can include 4 additional groups of program instructions GPI08 . . . GPI11 for execution by the one or more processors 250 of the computing device 254, as follows:

GPI08 for determining that the attacker can obtain second user credentials of a second user;

GPI09 for determining that, when using the second user credentials, the second user has access rights to a third network node of the networked system;

GPI10 for failing to detect, during a monitoring time interval, the third network node being accessed from a network node that is already known to be compromisable; and GPI11 for concluding, based on the failing to detect the third network node being accessed from a network node that is already known to be compromisable, that the third network node is not compromisable by the attacker using the second user credentials during the penetration testing campaign.

It should be noted that the phrase 'failing to detect' as used herein does not necessarily mean that the undetected event occurred—it simply means that such an occurrence was undetected, without implication as to whether such an event occurred.

Figure 6:
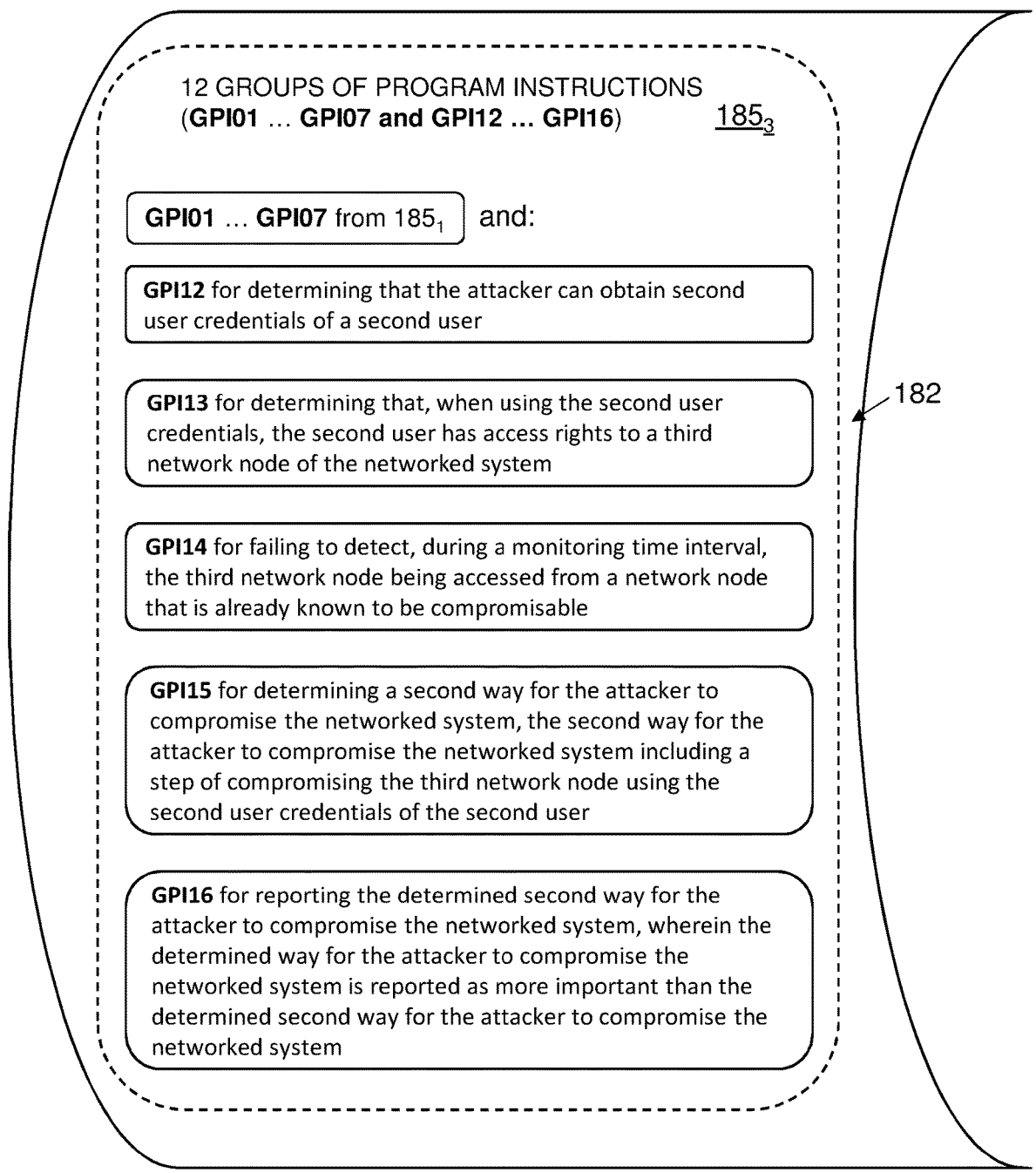

In some embodiments, as illustrated in FIG. 6, program instructions 185 can include 5 additional groups of program instructions GPI12 . . . GPI16 for execution by the one or more processors 250 of the computing device 254, as follows:

GPI12 for determining that the attacker can obtain second user credentials of a second user;

GPI13 for determining that, when using the second user credentials, the second user has access rights to a third network node of the networked system;

GPI14 for failing to detect, during a monitoring time interval, the third network node being accessed from a network node that is already known to be compromisable;

GPI15 for determining a second way for the attacker to compromise the networked system, the second way for the attacker to compromise the networked system including a step of compromising the third network node using the second user credentials of the second user; and GPI16 for reporting the determined second way for the attacker to compromise the networked system, wherein the determined way for the attacker to compromise the networked system is reported as more important than the determined second way for the attacker to compromise the networked system.

Figure 7:
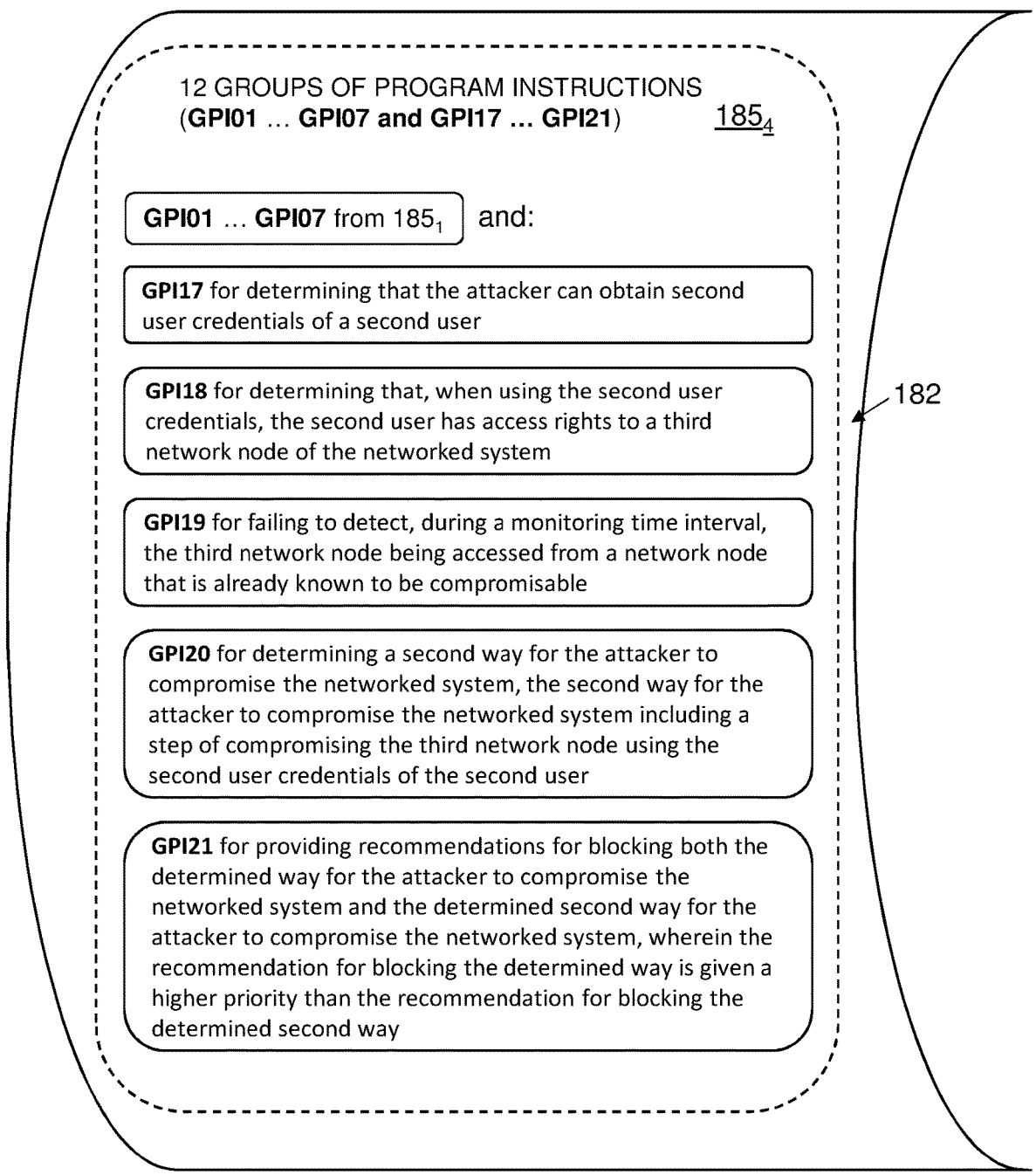
Figure 8:
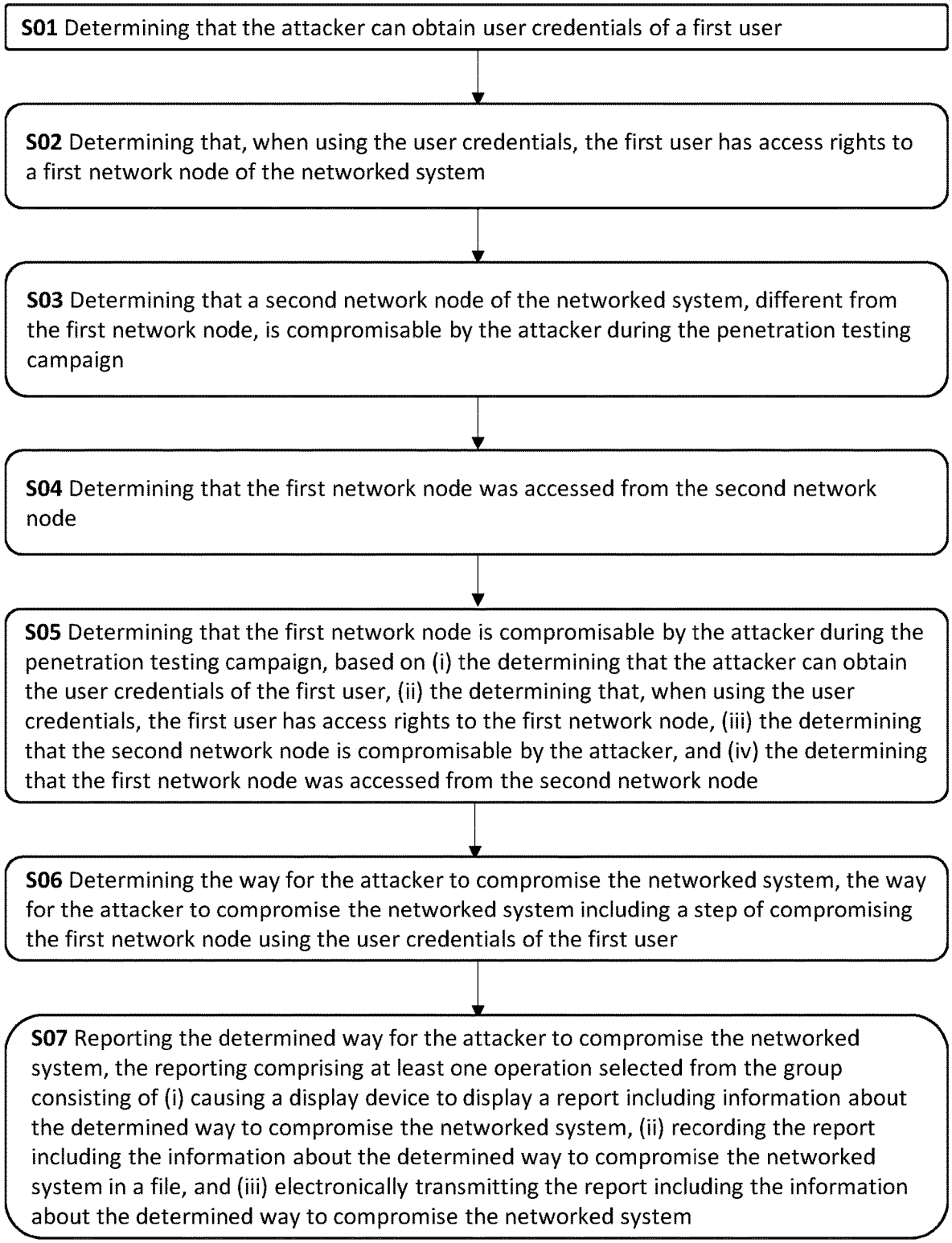
FIGS. 8, 9, 10 and 11 show flowcharts of methods of carrying out penetration testing campaigns of a networked system by a penetration testing system according to embodiments of the present invention.

In some embodiments, as illustrated in FIG. 7, program instructions 185 can include 5 additional groups of program instructions GPI17 . . . GPI21 for execution by the one or more processors 250 of the computing device 254, as follows:

GPI17 for determining that the attacker can obtain second user credentials of a second user;

GPI18 for determining that, when using the second user credentials, the second user has access rights to a third network node of the networked system;

GPI19 for failing to detect, during a monitoring time interval, the third network node being accessed from a network node that is already known to be compromisable;

GPI20 for determining a second way for the attacker to compromise the networked system, the second way for the attacker to compromise the networked system including a step of compromising the third network node using the second user credentials of the second user; and GPI21 for providing recommendations for blocking both the determined way for the attacker to compromise the networked system and the determined second way for the attacker to compromise the networked system, wherein the recommendation for blocking the determined way is given a higher priority than the recommendation for blocking the determined second way Referring now to FIG. 8, a method is disclosed for executing a penetration testing campaign in a networked system 200 by a penetration testing system 100, wherein the carrying out of the penetration testing campaign is for determining a way for an attacker to compromise the networked system 200. As illustrated by the flow chart in FIG. 8, the method comprises:

Step S01 Determining that the attacker can obtain user credentials of a first user. In some embodiments, Step S01 can comprise determining that the attacker can obtain a passwords file which contains the user credentials of the first user. In some embodiments, Step S01 comprises determining that the attacker can obtain a password of the first user by trying multiple guessed passwords that are known to be commonly used as passwords by users. In some embodiments, Step S01 comprises determining that, subsequent to the first user logging into a third network node of the networked system which is already known to be compromisable by the attacker, the attacker can extract the user credentials of the first user from a memory dump of the third network node. In some embodiments in which the penetration testing system comprises a reconnaissance agent software module that is installed on at least some of the network nodes 110 of the networked system 200, Step S01 is carried out, at least in part, by executing the reconnaissance agent software module in one of the network nodes of the networked system.

Step S02 Determining that, when using the user credentials, the first user has access rights to a first network node of the networked system 200 (e.g., node 110$_1$ in FIG. 2). In some embodiments, Step S02 comprises determining that the first user had logged into the first network node. In some embodiments, Step S02 comprises determining that the first user is included in a list of local administrators of the first network node. In some embodiments in which the penetration testing system comprises a reconnaissance agent software module that is installed on at least some of the network nodes 110 of the networked system 200, Step S02 is carried out, at least in part, by executing the reconnaissance agent software module in the first network node Step S03 Determining that a second network node of the networked system 200 (e.g., node 110$_6$ in FIG. 2), different from the first network node (e.g., node 110$_1$), is compromisable by the attacker during the penetration testing campaign.

Step S04 Determining that the first network node (e.g., node 110$_1$ in FIG. 2) was accessed from the second network node (e.g., node 110$_6$). In some embodiments, Step S04 comprises determining that the first network node was accessed from the second network node using user credentials of a second user that is different from the first user. In some embodiments, Step S04 comprises determining that the first network node was accessed from the second network node using the user credentials of the first user. In some embodiments, Step S04 comprises determining that a file in a shared folder in the first network node was read by the second network node. In some embodiments in which the penetration testing system comprises a reconnaissance agent software module that is installed on at least some of the network nodes 110 of the networked system 200, the determining that the first network node was accessed from the second network node is done, at least in part, by executing the reconnaissance agent software module in the first network node. In various embodiments, Step S04 can either be done during the carrying out of the penetration testing campaign or carried out prior to the carrying out of the penetration testing campaign. In some embodiments, Step S04 comprises (i) extracting, from a memory dump of the first network node, a network address from which the first network node was accessed and (ii) identifying the network address to be associated with the second network node.

Step S05 Determining that the first network node is compromisable by the attacker during the penetration testing campaign, based on (i) the determining that the attacker can obtain the user credentials of the first user, (ii) the determining that, when using the user credentials, the first user has access rights to the first network node, (iii) the determining that the second network node is compromisable by the attacker, and (iv) the determining that the first network node was accessed from the second network node;

Step S06 Determining the way for the attacker to compromise the networked system, the way for the attacker to compromise the networked system including a step of compromising the first network node using the user credentials of the first user; and Step S07 Reporting the determined way for the attacker to compromise the networked system, the reporting comprising at least one operation selected from the group consisting of (i) causing a display device to display a report including information about the determined way to compromise the networked system, (ii) recording the report including the information about the determined way to compromise the networked system in a file, and (iii) electronically transmitting the report including the information about the determined way to compromise the networked system.

Figure 9:
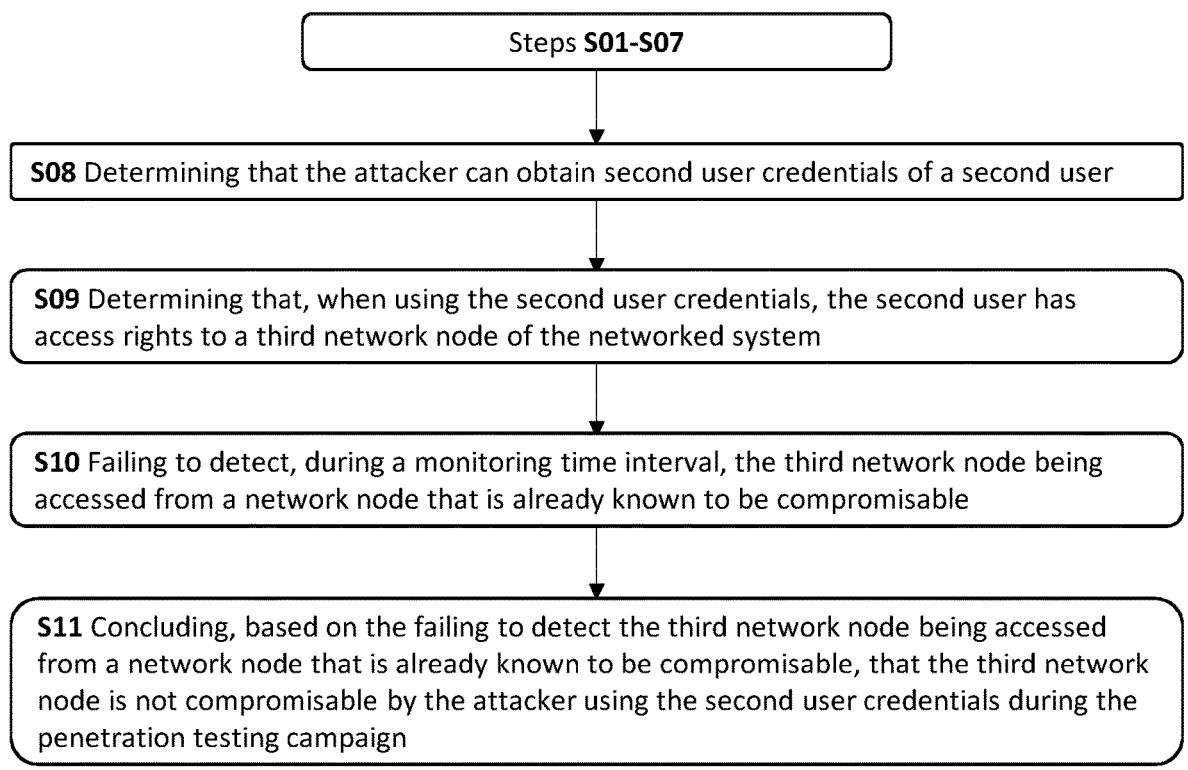

In some embodiments, as illustrated by the flow chart in FIG. 9, the method additionally comprises the following 4 steps:

Step S08 Determining that the attacker can obtain second user credentials of a second user;

Step S09 Determining that, when using the second user credentials, the second user has access rights to a third network node of the networked system;

Step S010 Failing to detect, during a monitoring time interval, the third network node being accessed from a network node that is already known to be compromisable; and Step S011 Concluding, based on the failing to detect the third network node being accessed from a network node that is already known to be compromisable, that the third network node is not compromisable by the attacker using the second user credentials during the penetration testing campaign.

Figure 10:
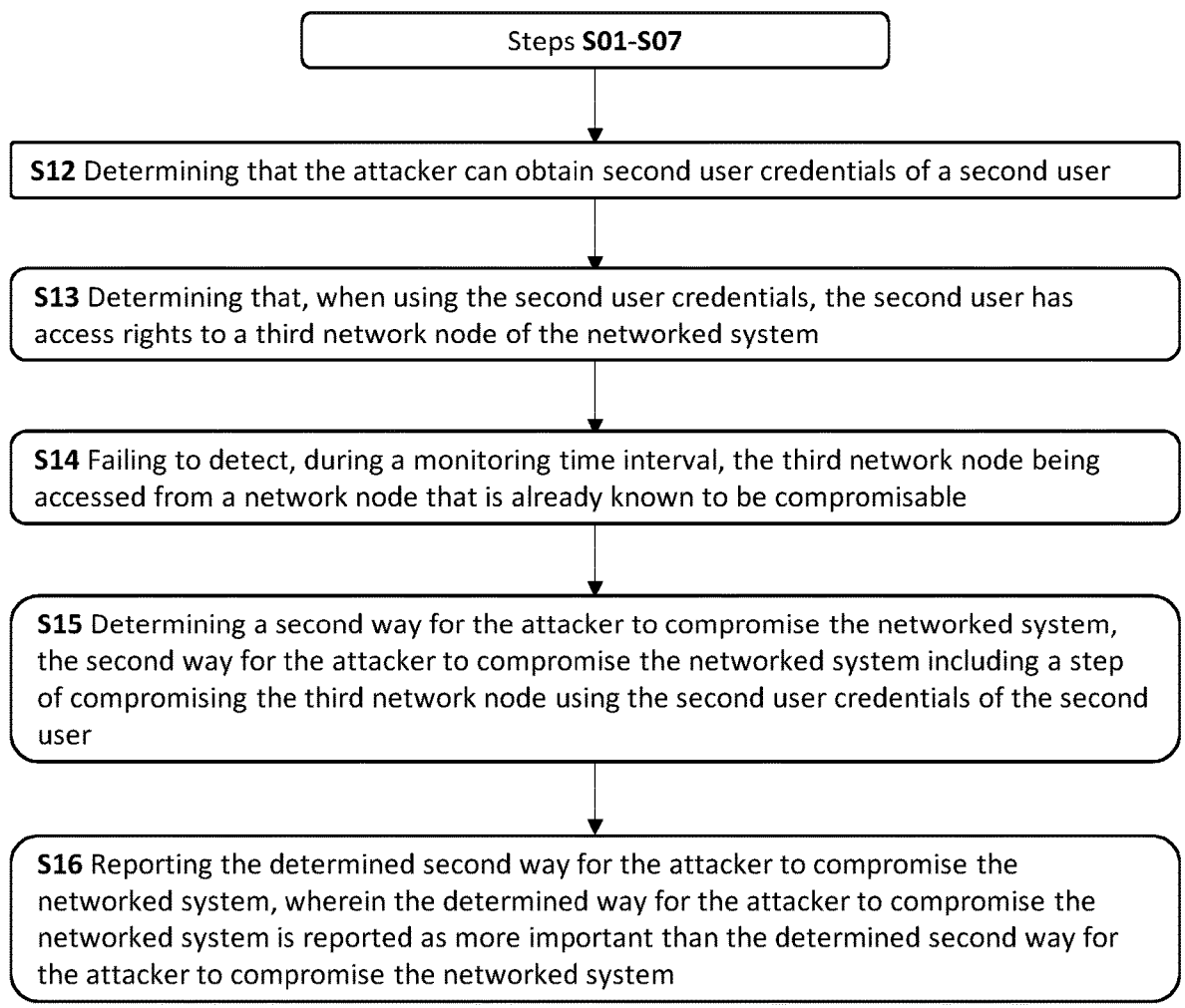

In some embodiments, as illustrated by the flow chart in FIG. 10, the method additionally comprises the following 5 steps:

Step S012 Determining that the attacker can obtain second user credentials of a second user;

Step S013 Determining that, when using the second user credentials, the second user has access rights to a third network node of the networked system;

Step S014 Failing to detect, during a monitoring time interval, the third network node being accessed from a network node that is already known to be compromisable;

Step S015 Determining a second way for the attacker to compromise the networked system, the second way for the attacker to compromise the networked system including a step of compromising the third network node using the second user credentials of the second user; and Step S016 Reporting the determined second way for the attacker to compromise the networked system, wherein the determined way for the attacker to compromise the networked system is reported as more important than the determined second way for the attacker to compromise the networked system.

Figure 11:
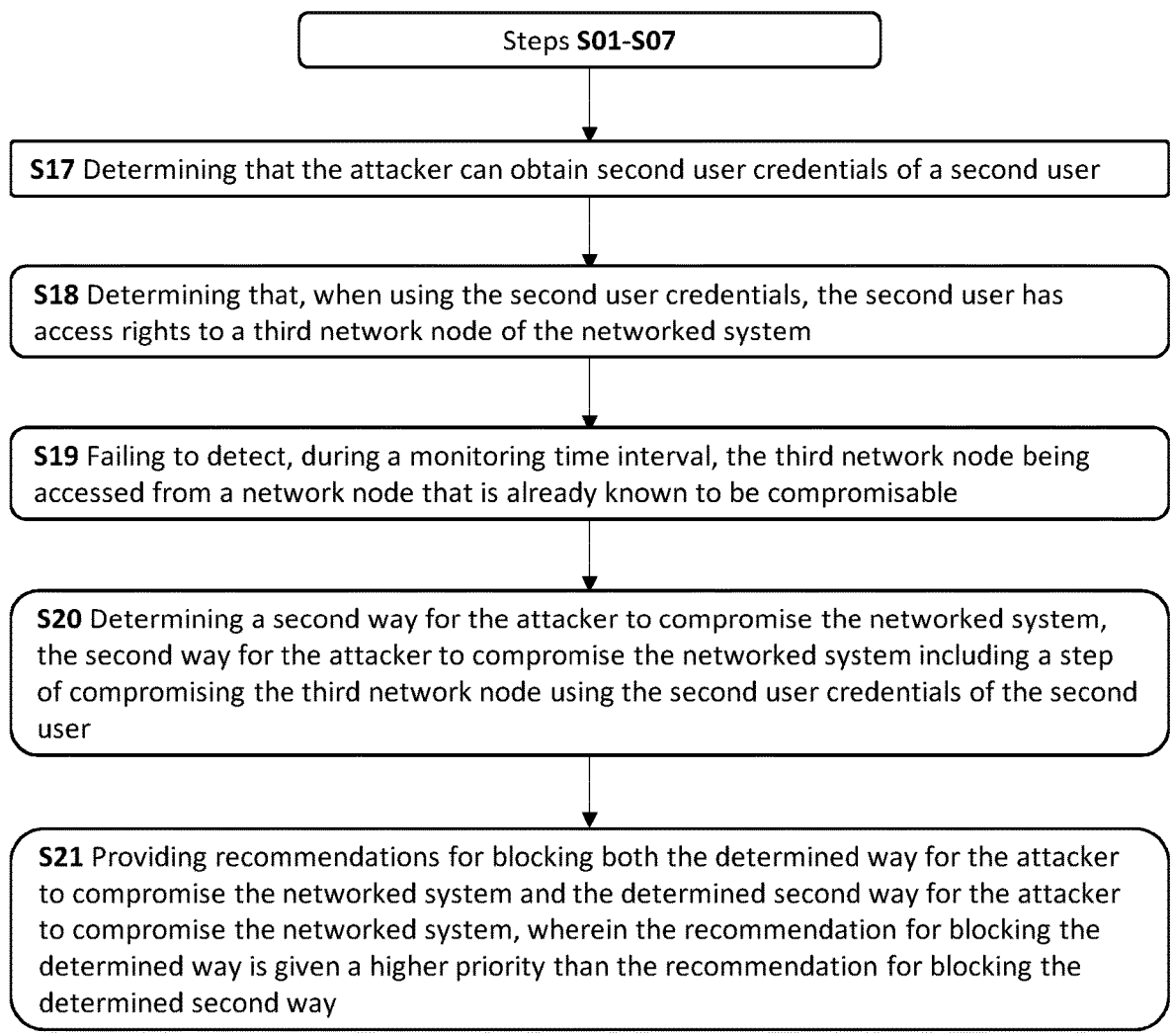

In some embodiments, as illustrated by the flow chart in FIG. 11, the method additionally comprises the following 5 steps:

Step S017 Determining that the attacker can obtain second user credentials of a second user;

Step S018 Determining that, when using the second user credentials, the second user has access rights to a third network node of the networked system;

Step S019 Failing to detect, during a monitoring time interval, the third network node being accessed from a network node that is already known to be compromisable;

Step S020 Determining a second way for the attacker to compromise the networked system, the second way for the attacker to compromise the networked system including a step of compromising the third network node using the second user credentials of the second user; and Step S021 Providing recommendations for blocking both the determined way for the attacker to compromise the networked system and the determined second way for the attacker to compromise the networked system, wherein the recommendation for blocking the determined way is given a higher priority than the recommendation for blocking the determined second way.

The foregoing discussion was given in the context of simulated penetration testing systems.

With reference once again to FIG. 2, in a second non-limiting example, an actual-attack, reconnaissance-agent penetration testing system can determine that a given node can be compromised by using user credentials (without compromising the given node itself), by operating as follows:

1. The penetration testing system compromises node $110_6$ so as to get full control of its operation.

2. The reconnaissance agent installed in node $110_6$ detects a login operation event, which was done by user X. The detection may be done by looking for login events in the security events log of node $110_6$.

3. Once a login event occurs, it is expected that the RAM of node $110_6$ contains an explicit (non-hashed) copy of the credentials of user X which were used for the logging-in operation. Therefore, a memory dump is obtained by the agent of node $110_6$ in response to detecting the logging-in event.

4. The credentials of user X are identified in the dump and extracted out, e.g., using open source tools that can do this task, and in this way the penetration testing system obtains the credentials of user X.

5. It is determined that user X has access rights to node $110_1$ (e.g. it is determined by the agent installed in node $110_1$ that user X is included in the local admin list of node $110_1$).

6. The reconnaissance agent of node $110_1$ looks for login operation events done using the credentials of user X. The detection may be done by looking for login events in the security events log of node $110_1$, obtaining a memory dump and extracting from it the credentials being used in the login operation.

7. When a login operation using the credentials of user X is detected in node $110_1$, the agent of node $110_1$ determines the IP address from which the login operation was made.

8. If the determined IP address corresponds to a node that is already compromised in the current campaign (whether node $110_6$ or another node), it is concluded that node $110_1$ can be compromised by the attacker using the user credentials of user X. This is concluded with certainty, since we know that (i) following the compromising of node $110_6$, the attacker could obtain the credentials of user X, which has access rights to node $110_1$, and (ii) once the credentials are known to the attacker, he could cause an already-compromised node, which is known with certainty to be able to reach node $110_1$, to log into node $110_1$. It should be noted that even though we are dealing in this example with an actual-attack penetration testing system, node $110_1$ is determined to be compromisable without being compromised. This is because it is preferred not to take the risk that an attempt to compromise the node might result in locking it, without the penetration testing system being able to unlock it at the end of the campaign.

The network and penetration testing system components illustrated in FIGS. 3A and 3B and discussed hereinabove are suitable for an actual-attack penetration testing system according to the present second example.

Figure 12A:
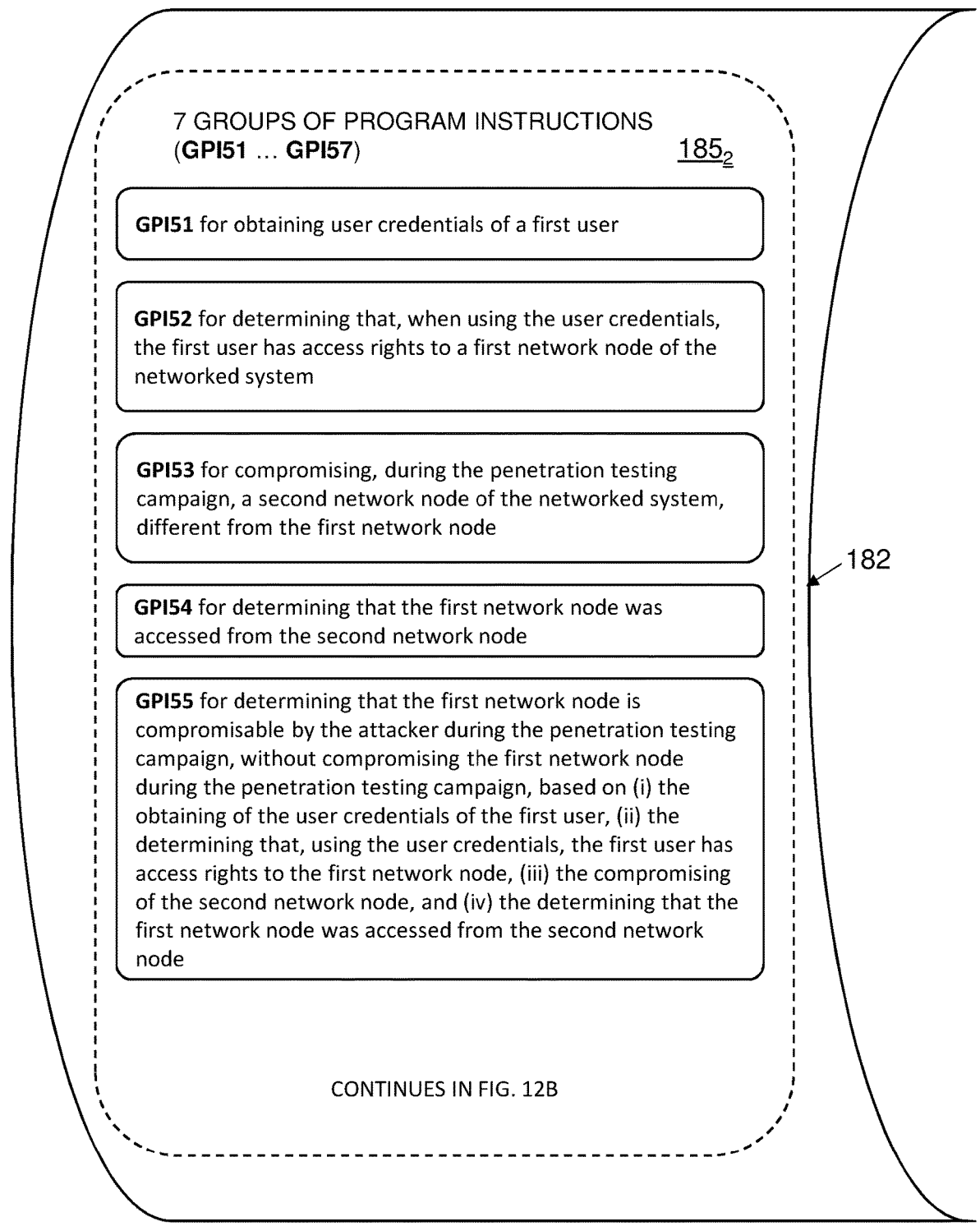
FIGS. 12A and 12B together show a block diagram of a non-transitory computer-readable storage medium comprising respective program instructions according to embodiments of the present invention.
Figure 12B:
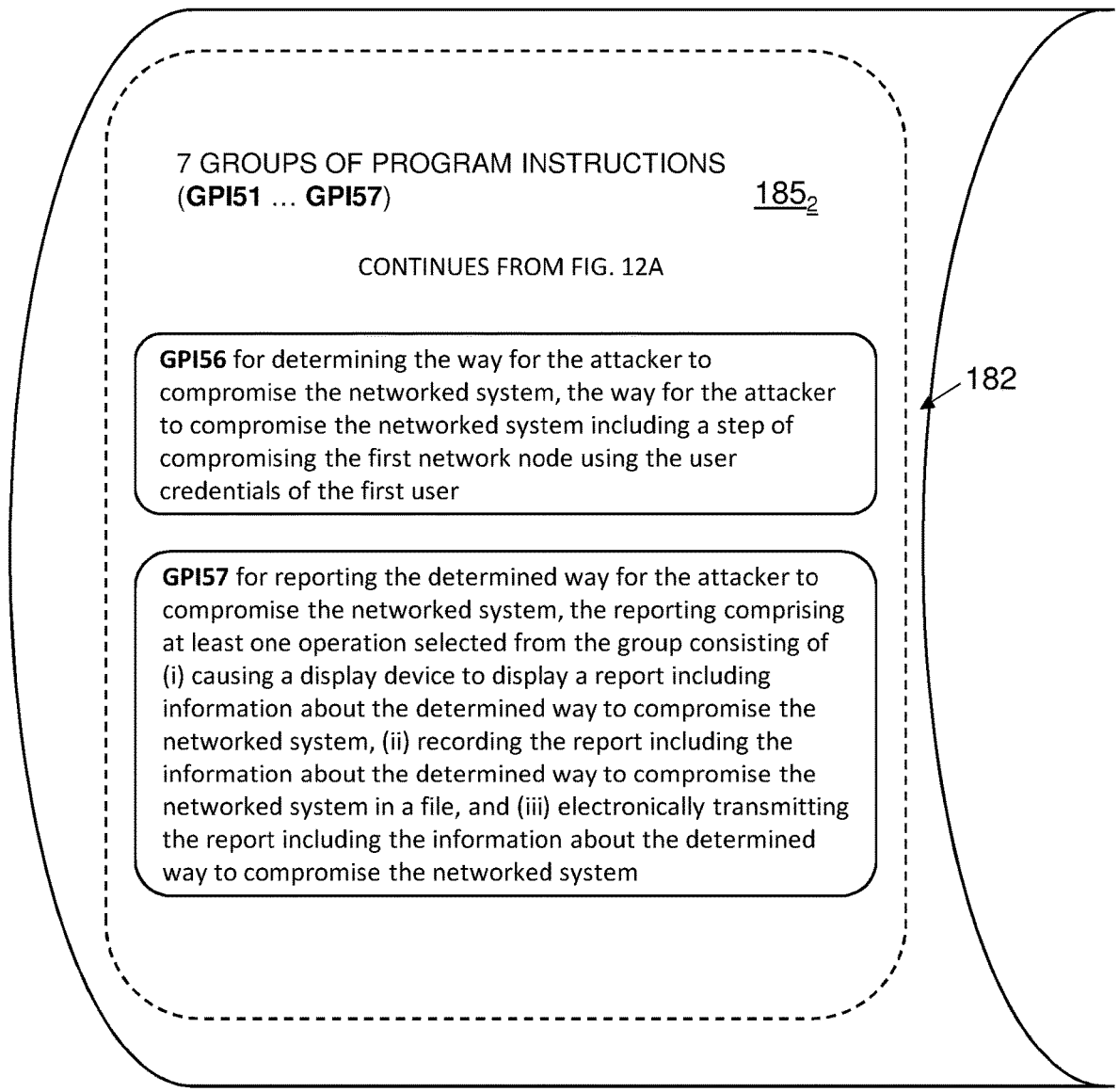

As illustrated in the block diagram of FIGS. 12A and 12B, storage medium 182 includes program instructions 185, which include 7 groups of program instructions GPI51 . . . GPI57. Execution of the program instructions 185 by the one or more processors 250 of the computing device 254 causes the one or more processors 250 of the computing device 254 to execute the following groups of program instructions:

GPI51 for obtaining user credentials of a first user;

GPI52 for determining that, when using the user credentials, the first user has access rights to a first network node of the networked system;

GPI53 for compromising, during the penetration testing campaign, a second network node of the networked system, different from the first network node;

GPI54 for determining that the first network node was accessed from the second network node;

GPI55 for determining that the first network node is compromisable by the attacker during the penetration testing campaign, without compromising the first network node during the penetration testing campaign, based on (i) the obtaining of the user credentials of the first user, (ii) the determining that, using the user credentials, the first user has access rights to the first network node, (iii) the compromising of the second network node, and (iv) the determining that the first network node was accessed from the second network node;

GPI56 for determining the way for the attacker to compromise the networked system, the way for the attacker to compromise the networked system including a step of compromising the first network node using the user credentials of the first user; and GPI57 for reporting the determined way for the attacker to compromise the networked system, the reporting comprising at least one operation selected from the group consisting of (i) causing a display device to display a report including information about the determined way to compromise the networked system, (ii) recording the report including the information about the determined way to compromise the networked system in a file, and (iii) electronically transmitting the report including the information about the determined way to compromise the networked system.

Figure 13:
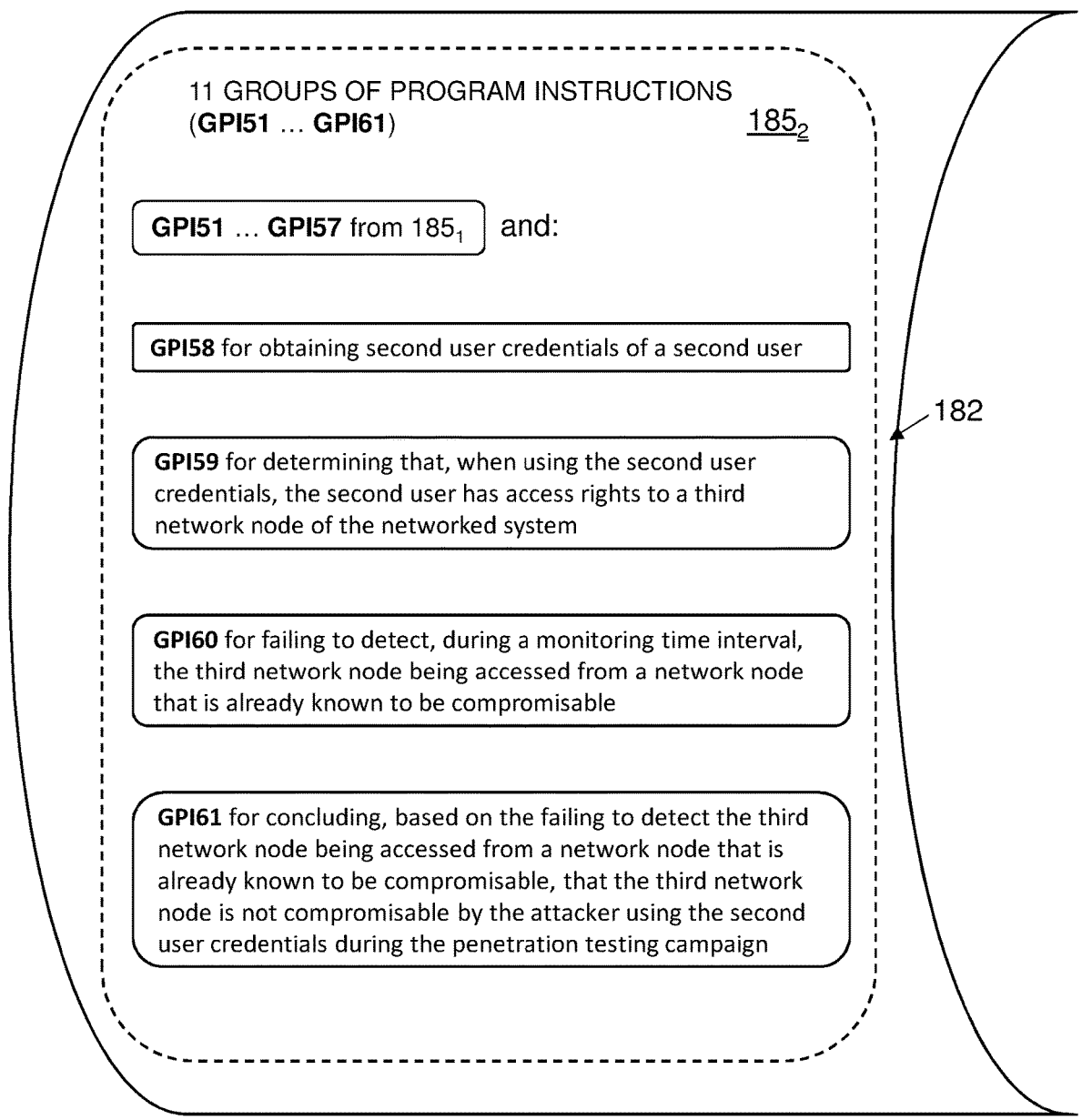
FIGS. 13, 14 and 15 show respective additional groups of program instructions which can be optionally stored in the non-transitory computer-readable storage medium of FIGS. 4A and 4B according to embodiments of the present invention.

In some embodiments, as illustrated in FIG. 13, program instructions 185 can include 4 additional groups of program instructions GPI58 . . . GPI61 for execution by the one or more processors 250 of the computing device 254, as follows:

GPI58 for obtaining second user credentials of a second user;

GPI59 for determining that, when using the second user credentials, the second user has access rights to a third network node of the networked system;

GPI60 for failing to detect, during a monitoring time interval, the third network node being accessed from a network node that is already known to be compromisable; and GPI61 for concluding, based on the failing to detect the third network node being accessed from a network node that is already known to be compromisable, that the third network node is not compromisable by the attacker using the second user credentials during the penetration testing campaign.

It should be noted that the phrase 'failing to detect' as used herein does not necessarily mean that the undetected event occurred—it simply means that such an occurrence was undetected, without implication as to whether such an event occurred.

Figure 14:
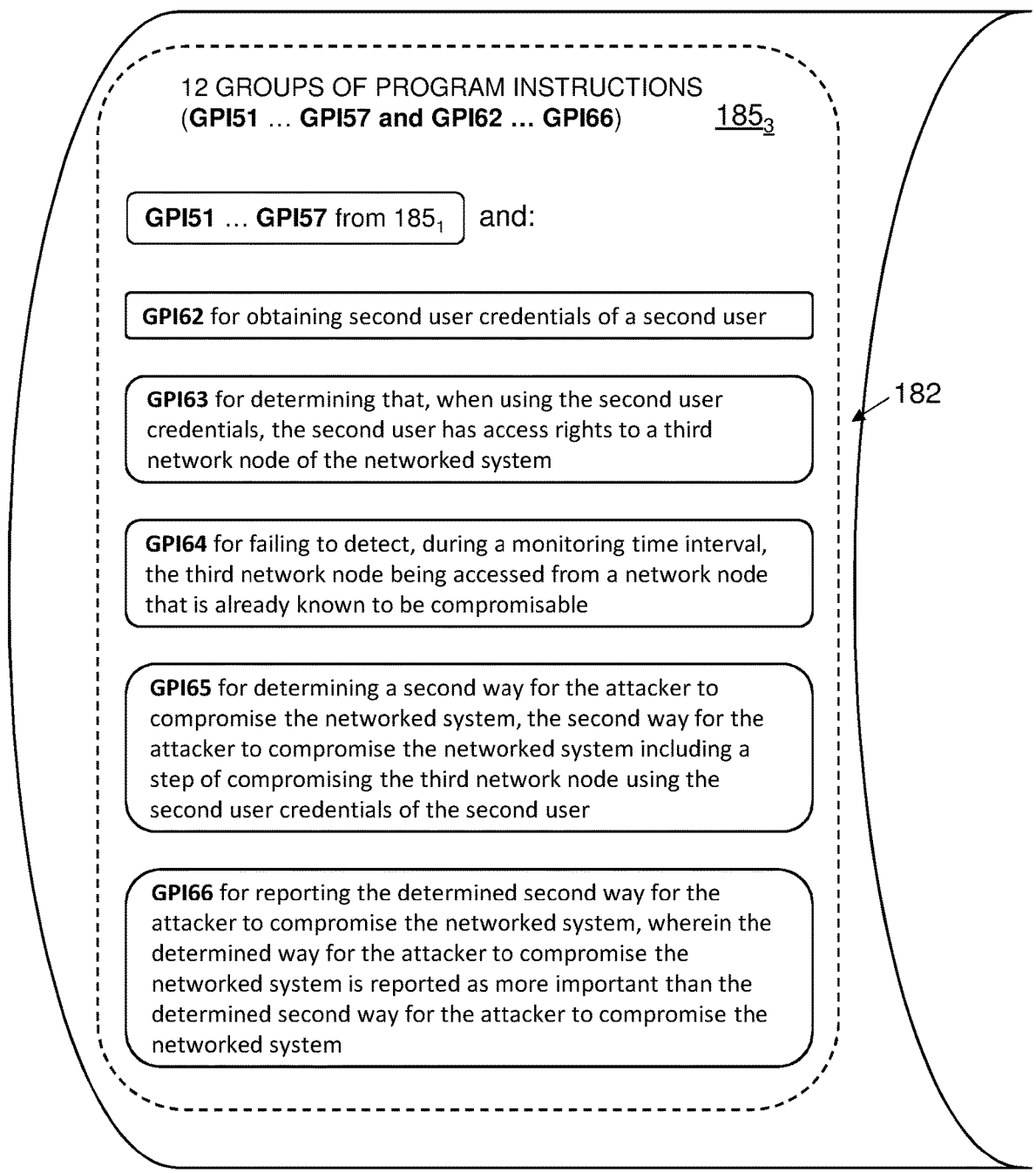

In some embodiments, as illustrated in FIG. 14, program instructions 185 can include 5 additional groups of program instructions GPI62 . . . GPI66 for execution by the one or more processors 250 of the computing device 254, as follows:

GPI62 for obtaining second user credentials of a second user;

GPI63 for determining that, when using the second user credentials, the second user has access rights to a third network node of the networked system;

GPI64 for failing to detect, during a monitoring time interval, the third network node being accessed from a network node that is already known to be compromisable;

GPI65 for determining a second way for the attacker to compromise the networked system, the second way for the attacker to compromise the networked system including a step of compromising the third network node using the second user credentials of the second user; and GPI66 for reporting the determined second way for the attacker to compromise the networked system, wherein the determined way for the attacker to compromise the networked system is reported as more important than the determined second way for the attacker to compromise the networked system.

Figure 15:
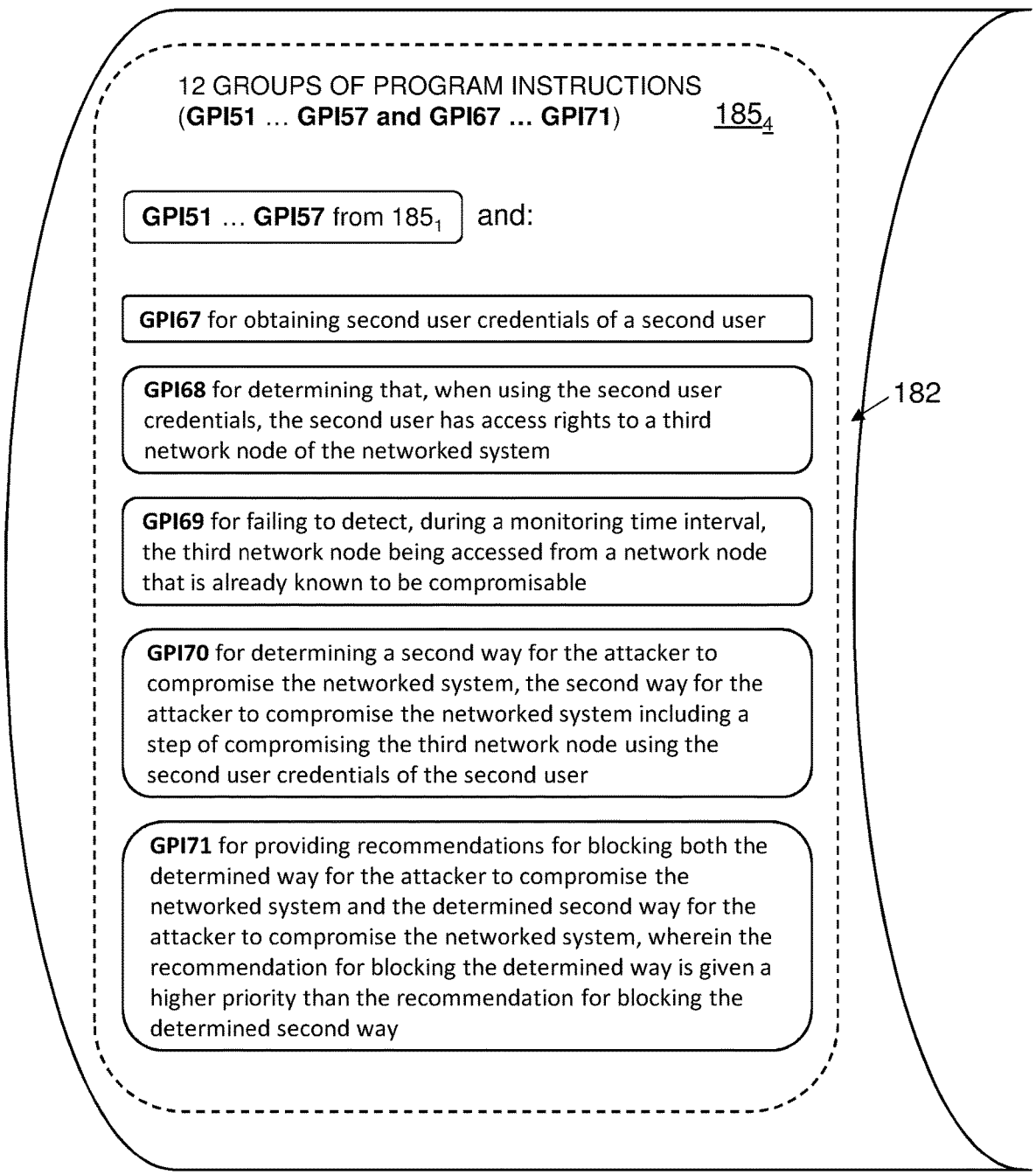
Figure 16:
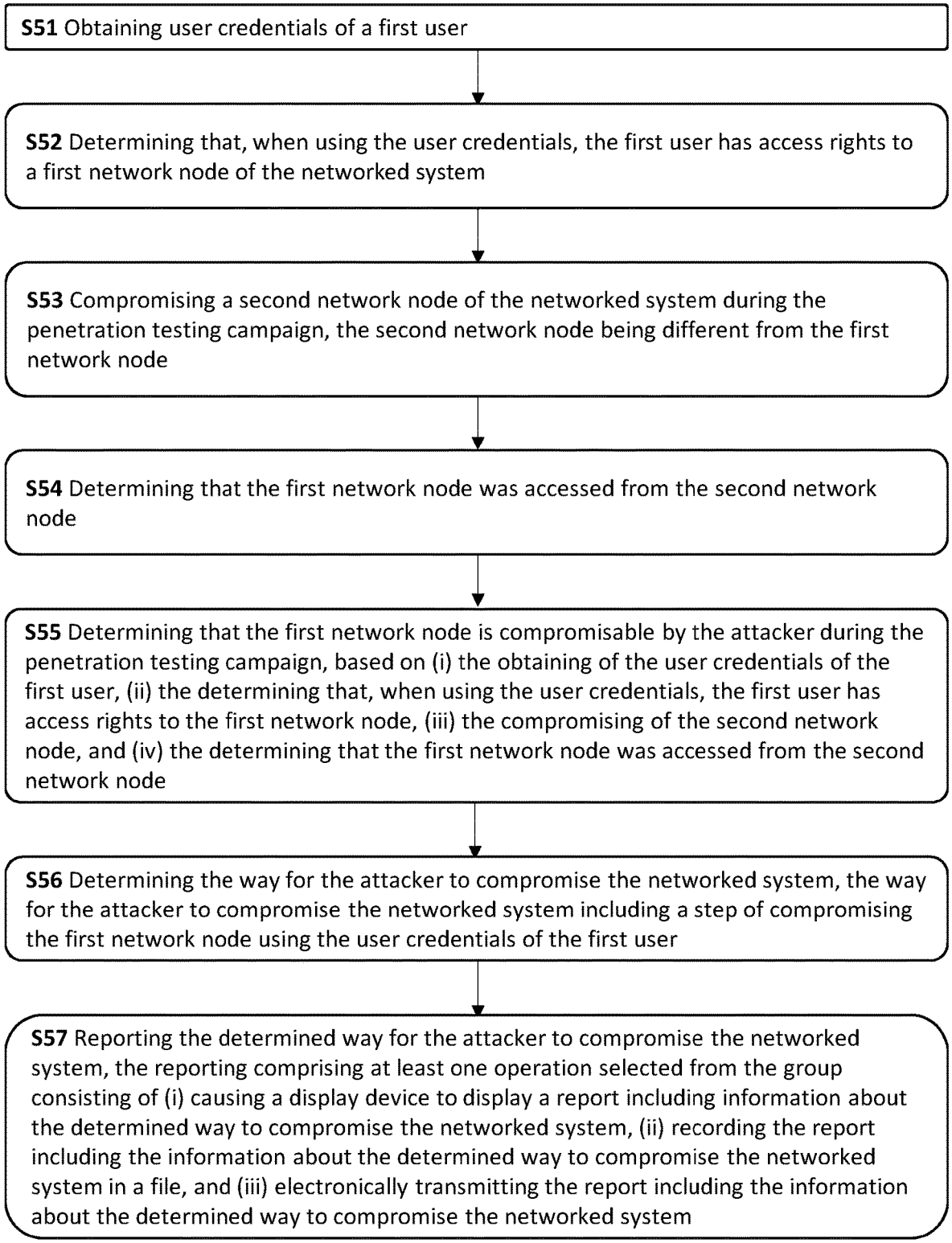
FIGS. 16, 17, 18 and 19 show flowcharts of methods of carrying out penetration testing campaigns of a networked system by a penetration testing system according to embodiments of the present invention.

In some embodiments, as illustrated in FIG. 15, program instructions 185 can include 5 additional groups of program instructions GPI67 . . . GPI71 for execution by the one or more processors 250 of the computing device 254, as follows:

GPI67 for obtaining second user credentials of a second user;

GPI68 for determining that, when using the second user credentials, the second user has access rights to a third network node of the networked system;

GPI69 for failing to detect, during a monitoring time interval, the third network node being accessed from a network node that is already known to be compromisable;

GPI70 for determining a second way for the attacker to compromise the networked system, the second way for the attacker to compromise the networked system including a step of compromising the third network node using the second user credentials of the second user; and GPI71 for providing recommendations for blocking both the determined way for the attacker to compromise the networked system and the determined second way for the attacker to compromise the networked system, wherein the recommendation for blocking the determined way is given a higher priority than the recommendation for blocking the determined second way Referring now to FIG. 16, a method is disclosed for executing a penetration testing campaign in a networked system 200 by a penetration testing system 100, wherein the carrying out of the penetration testing campaign is for determining a way for an attacker to compromise the networked system 200. As illustrated by the flow chart in FIG. 16, the method comprises:

Step S51 Obtaining user credentials of a first user. In some embodiments, Step S51 can comprise determining that the attacker can obtain a passwords file which contains the user credentials of the first user. In some embodiments, Step S51 comprises determining that the attacker can obtain a password of the first user by trying multiple guessed passwords that are known to be commonly used as passwords by users. In some embodiments, Step S51 comprises extracting the user credentials of the first user from a memory dump of a third network node which is already known to be compromisable by the attacker, subsequent to the first user logging into the third network node of the networked system. In some embodiments in which the penetration testing system comprises a reconnaissance agent software module that is installed on at least some of the network nodes 110 of the networked system 200, Step S51 is carried out, at least in part, by executing the reconnaissance agent software module in one of the network nodes of the networked system.

Step S52 Determining that, when using the user credentials, the first user has access rights to a first network node of the networked system 200 (e.g., node $110_1$ in FIG. 2). In some embodiments, Step S52 comprises determining that the first user had logged into the first network node. In some embodiments, Step S52 comprises determining that the first user is included in a list of local administrators of the first network node. In some embodiments in which the penetration testing system comprises a reconnaissance agent software module that is installed on at least some of the network nodes 110 of the networked system 200, Step S52 is carried out, at least in part, by executing the reconnaissance agent software module in the first network node Step S53 Compromising a second network node (e.g., node $110_6$ in FIG. 2) of the networked system during the penetration testing campaign, the second network node being different from the first network node (e.g., node $110_1$).

Step S54 Determining that the first network node (e.g., node $110_1$ in FIG. 2) was accessed from the second network node (e.g., node $110_6$). In some embodiments, Step S54 comprises determining that the first network node was accessed from the second network node using user credentials of a second user that is different from the first user. In some embodiments, Step S54 comprises determining that the first network node was accessed from the second network node using the user credentials of the first user. In some embodiments, Step S54 comprises determining that a file in a shared folder in the first network node was read by the second network node. In some embodiments in which the penetration testing system comprises a reconnaissance agent software module that is installed on at least some of the network nodes 110 of the networked system 200, the determining that the first network node was accessed from the second network node is done, at least in part, by executing the reconnaissance agent software module in the first network node. In various embodiments, Step S54 can either be done during the carrying out of the penetration testing campaign or carried out prior to the carrying out of the penetration testing campaign. In some embodiments, Step S54 comprises (i) extracting, from a memory dump of the first network node, a network address from which the first network node was accessed and (ii) identifying the network address to be associated with the second network node.

Step S55 Determining that the first network node is compromisable by the attacker during the penetration testing campaign, based on (i) the obtaining of the user credentials of the first user, (ii) the determining that, when using the user credentials, the first user has access rights to the first network node, (iii) the compromising of the second network node, and (iv) the determining that the first network node was accessed from the second network node;

Step S56 Determining the way for the attacker to compromise the networked system, the way for the attacker to compromise the networked system including a step of compromising the first network node using the user credentials of the first user; and Step S57 Reporting the determined way for the attacker to compromise the networked system, the reporting comprising at least one operation selected from the group consisting of (i) causing a display device to display a report including information about the determined way to compromise the networked system, (ii) recording the report including the information about the determined way to compromise the networked system in a file, and (iii) electronically transmitting the report including the information about the determined way to compromise the networked system.

Figure 17:
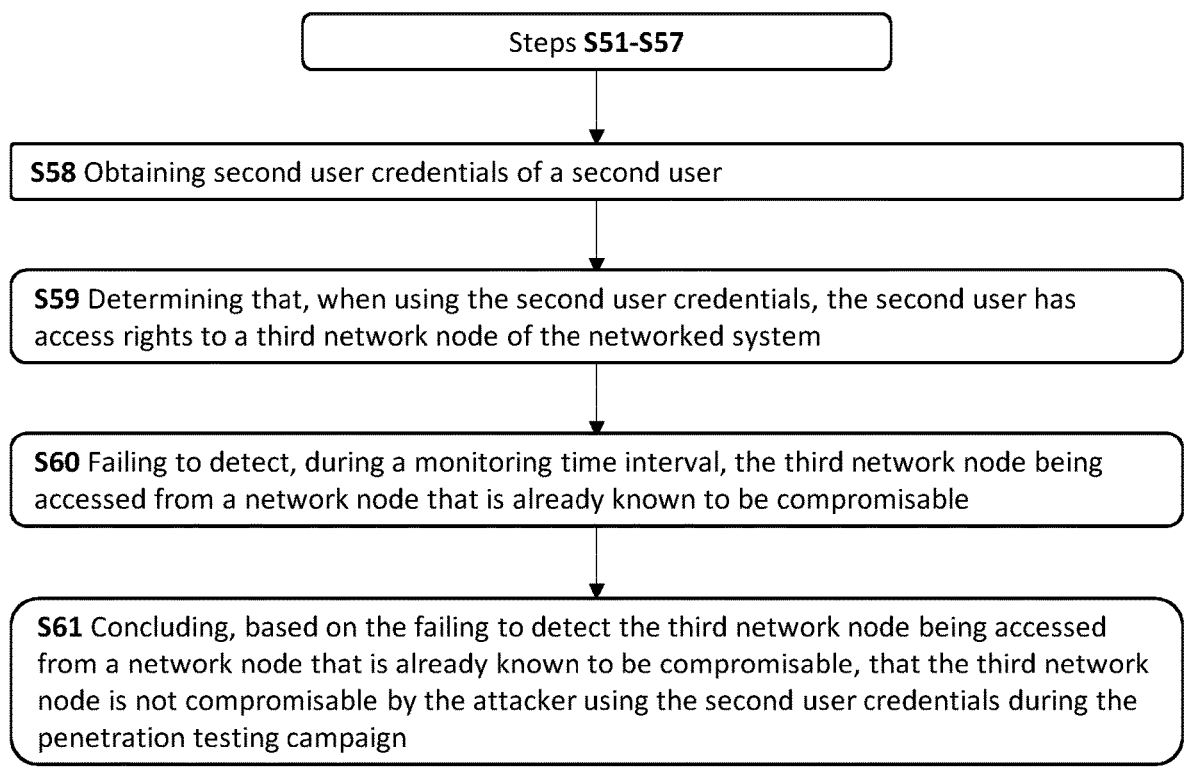

In some embodiments, and as illustrated by the flow chart in FIG. 17, the method additionally comprises the following 4 steps:

Step S58 Obtaining second user credentials of a second user;

Step S59 Determining that, when using the second user credentials, the second user has access rights to a third network node of the networked system;

Step S60 Failing to detect, during a monitoring time interval, the third network node being accessed from a network node that is already known to be compromisable; and Step S61 Concluding, based on the failing to detect the third network node being accessed from a network node that is already known to be compromisable, that the third network node is not compromisable by the attacker using the second user credentials during the penetration testing campaign.

Figure 18:
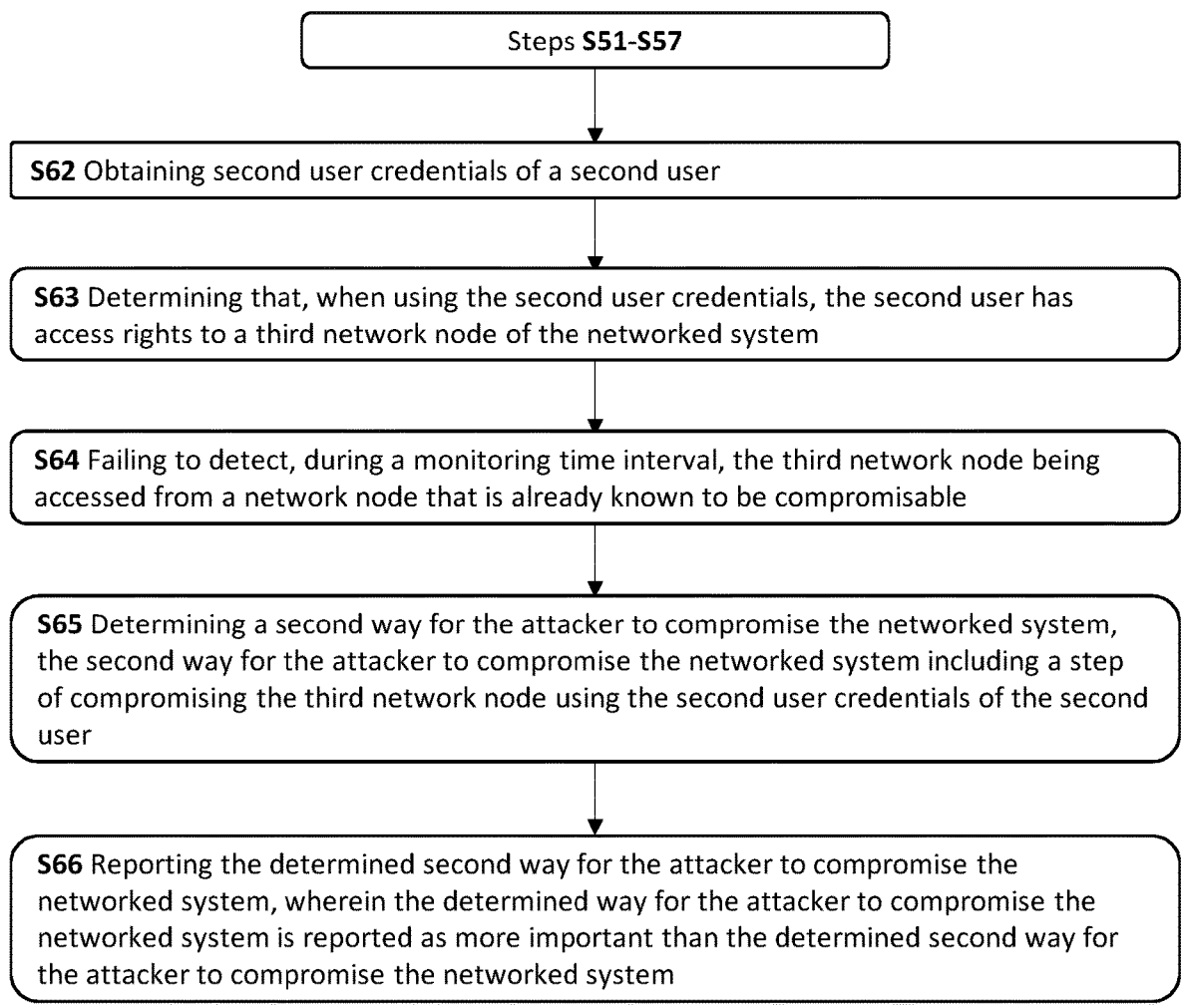
Figure 19:
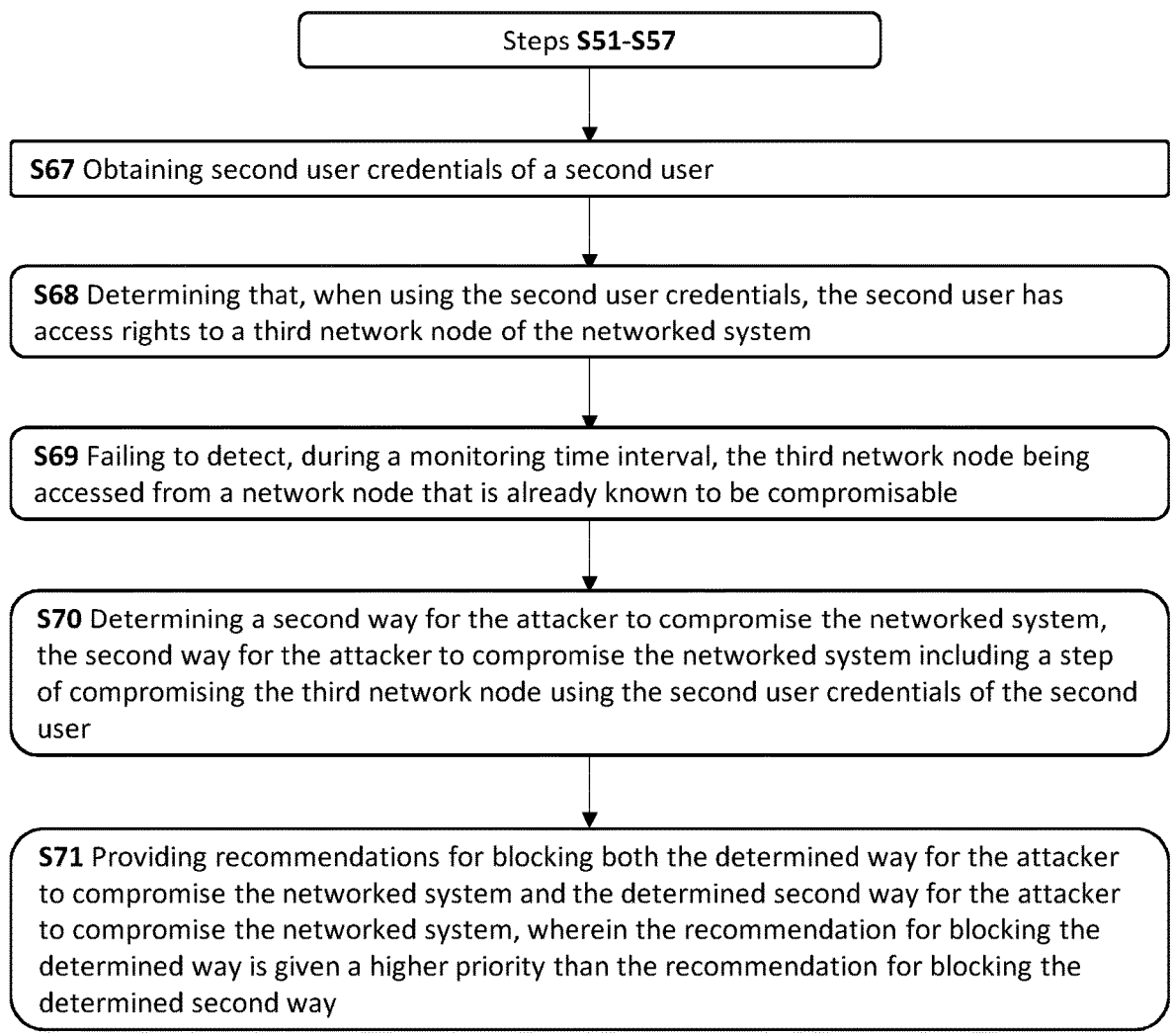

In some embodiments, and as illustrated by the flow chart in FIG. 18, the method additionally comprises the following 5 steps:

Step S62 Obtaining second user credentials of a second user;

Step S63 Determining that, when using the second user credentials, the second user has access rights to a third network node of the networked system;

Step S64 Failing to detect, during a monitoring time interval, the third network node being accessed from a network node that is already known to be compromisable;

Step S65 Determining a second way for the attacker to compromise the networked system, the second way for the attacker to compromise the networked system including a step of compromising the third network node using the second user credentials of the second user; and Step S66 Reporting the determined second way for the attacker to compromise the networked system, wherein the determined way for the attacker to compromise the networked system is reported as more important than the determined second way for the attacker to compromise the networked system In some embodiments, and as illustrated by the flow chart in FIG. 19, the method additionally comprises the following 5 steps:

Step S67 Obtaining second user credentials of a second user;

Step S68 Determining that, when using the second user credentials, the second user has access rights to a third network node of the networked system;

Step S69 Failing to detect, during a monitoring time interval, the third network node being accessed from a network node that is already known to be compromisable;

Step S70 Determining a second way for the attacker to compromise the networked system, the second way for the attacker to compromise the networked system including a step of compromising the third network node using the second user credentials of the second user; and Step S71 Providing recommendations for blocking both the determined way for the attacker to compromise the networked system and the determined second way for the attacker to compromise the networked system, wherein the recommendation for blocking the determined way is given a higher priority than the recommendation for blocking the determined second way.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

DEFINITIONS

This disclosure should be interpreted according to the definitions below.

In case of a contradiction between the definitions in this Definitions section and other sections of this disclosure, this section should prevail.

In case of a contradiction between the definitions in this section and a definition or a description in any other document, including in another document incorporated in this disclosure by reference, this section should prevail, even if the definition or the description in the other document is commonly accepted by a person of ordinary skill in the art.

1. "computing device"—Any device having a processing unit into which it is possible to install code that can be executed by the processing unit. The installation of the code may be possible even while the device is operative in the field or it may be possible only in the factory.

2. "peripheral device"—Any device, whether a computing device or not, that provides input or output services to at least one other device that is a computing device. Examples of peripheral devices are printers, plotters, scanners, environmental sensors, smart-home controllers, digital cameras, speakers and display screens. A peripheral device may be directly connected to a single computing device or may be connected to a communication system through which it can communicate with one or more computing devices. A storage device that is (i) not included in or directly connected to a single computing device, and (ii) accessible by multiple computing devices, is a peripheral device.

3. "network" or "computing network"—A collection of computing devices and peripheral devices which are all connected to common communication means that allow direct communication between any two of the devices without requiring passing the communicated data through a third device. The network includes both the connected devices and the communication means. A network may be wired or wireless or partially wired and partially wireless.

4. "networked system" or "networked computing system"—One or more networks that are interconnected so that communication is possible between any two devices of the one or more networks, even if they do not belong to the same network. The connection between different networks of the networked system may be achieved through dedicated computing devices, and/or through computing devices that belong to multiple networks of the networked system and also have other functionality in addition to connecting between networks. The networked system includes the one or more networks, any connecting computing devices and also peripheral devices accessible by any computing device of the networked system. Note that a single network is a networked system having only one network, and therefore a network is a special case of a networked system.

5. "module"—A portion of a system that implements a specific task. A module may be composed of hardware, software or any combination of both. For example, in a module composed of both hardware and software, the hardware may include a portion of a computing device, a single computing device or multiple computing devices, and the software may include software code executed by the portion of the computing device, by the single computing device or by the multiple computing devices. A computing device associated with a module may include one or more processors and computer readable storage medium (non-transitory, transitory or a combination of both) for storing instructions or for executing instructions by the one or more processors.

6. "network node of a networked system" or "node of a networked system"—Any computing device or peripheral device that belongs to the networked system.

7. "security vulnerability of a network node" or "vulnerability of a network node"—A weakness which allows an attacker to compromise the network node. A vulnerability of a network node may be caused by one or more of a flawed configuration of a component of the network node, a flawed setting of a software module in the network node, a bug in a software module in the network node, a human error while operating the network node, having trust in an already-compromised other network node, and the like.

A weakness that allows an attacker to compromise a network node only conditionally, depending on current conditions in the network node or in the networked system in which the network node resides, is still a vulnerability of the network node, but may also be referred to as a "potential vulnerability of the network node". For example, a vulnerability that compromises any network node running the Windows 7 Operating System, but only if the network node receives messages through a certain Internet port, can be said to be a vulnerability of any Windows 7 network node, and can also be said to be a potential vulnerability of any such node. Note that in this example the potential vulnerability may fail in compromising the node either because the certain port is not open (a condition in the node) or because a firewall is blocking messages from reaching the certain port in the node (a condition of the networked system).
8. "security vulnerability of a networked system" or "vulnerability of a networked system"—A weakness which allows an attacker to compromise the networked system. A vulnerability of a networked system may be caused by one or more of a vulnerability of a network node of the networked system, a flawed configuration of a component of the networked system, a flawed setting of a software module in the networked system, a bug in a software module in the networked system, a human error while operating the networked system, and the like. A weakness that allows an attacker to compromise a networked system only conditionally, depending on current conditions in the networked system, is still a vulnerability of the networked system, but may also be referred to as a "potential vulnerability of the networked system". For example, if a network node of the networked system has a potential vulnerability then that vulnerability can be said to be a vulnerability of the networked system, and can also be said to be a potential vulnerability of the networked system.
9. "validating a vulnerability" or "validating a potential vulnerability" (for a given network node or for a given networked system)—Verifying that the vulnerability compromises the given network node or the given networked system under the conditions currently existing in the given network node or the given networked system.
   The validation of the vulnerability may be achieved by actively attempting to compromise the given network node or the given networked system and then checking if the compromising attempt was successful. Such validation is referred to as "active validation".
   Alternatively, the validation of the vulnerability may be achieved by simulating the exploitation of the vulnerability or by otherwise evaluating the results of such exploitation without actively attempting to compromise the given network node or the given networked system. Such validation is referred to as "passive validation". Note that just assuming that a vulnerability will succeed in compromising a given network node or a given networked system under current conditions without executing either active validation or passive validation, is not considered as validating the vulnerability.
10. "vulnerability management"—A cyclical practice of identifying, classifying, remediating, and mitigating vulnerabilities of network nodes in a networked system.
11. "penetration testing" or "pen testing" (in some references also known as "red team assessment" or "red team testing", but in other references those terms referring to a red team have a different meaning than "penetration testing")—A process in which a networked system is evaluated in order to determine if it can be compromised by an attacker by utilizing one or more security vulnerabilities of the networked system. If it is determined that the networked system can be compromised, then the one or more security vulnerabilities of the networked system are identified and reported.
   Unlike a vulnerability management process which operates at the level of isolated vulnerabilities of individual network nodes, a penetration test may operate at a higher level which considers vulnerabilities of multiple network nodes that might be jointly used by an attacker to compromise the networked system. A penetration testing process involves at least the following functions: (i) a reconnaissance function, (ii) an attack function, and (iii) a reporting function. It should be noted that the above functions do not necessarily operate sequentially according to the above order, but may operate in parallel or in an interleaved mode. Unless otherwise explicitly specified, a reference to penetration testing should be understood as referring to automated penetration testing.
12. "automated penetration testing"—Penetration testing in which at least one of the reconnaissance function, the attack function and the reporting function is at least partially automated.
13. "penetration testing system"—A system capable of performing penetration testing, regardless if composed of hardware, software or combination of both.
14. "reconnaissance function" or "recon function"—The function in a penetration testing process that handles collection of data about the tested networked system. The collected data may include internal data of one or more network nodes of the tested networked system. Additionally, the collected data may include data about communication means of the tested networked system and about peripheral devices of the tested networked system. The collected data may also include data that is only indirectly related to the tested networked system, for example business intelligence data about the organization owning the tested networked system, collected in order to use it for assessing importance of resources of the networked system.
   The functionality of a reconnaissance function may be implemented by any combination of (i) software executing in a remote computing device, where the remote computing device may probe the tested networked system for the purpose of collecting data about it, (ii) hardware and/or software simulating or duplicating the tested networked system, (iii) a reconnaissance agent software module executing in one or more network nodes of the tested networked system.
15. "attack function"—The function in a penetration testing process that handles determination of whether one or more security vulnerabilities exist in the tested networked system. The determination is based on data collected by the reconnaissance function of the penetration testing. The attack function generates data about each of the identified security vulnerabilities, if any. The functionality of an attack function may be implemented by any combination of (i) software executing in a remote computing device, where the remote computing device may attack the tested networked system for the purpose of verifying that it can be compromised, (ii) hardware and/or software simulating or duplicating the tested networked system, (iii) an attack agent software module executing in one or more network nodes of the tested networked system. The methods used by an attack function may include executing a real attack on the tested networked system by attempting to change at least one setting, mode or state of a network node or of a hardware or software component of a network node, in order to verify that the tested networked system may be compromised. In such case, the attempt may result in actually compromising the tested networked system. Alternatively, the methods used by an attack function may be such that whenever there is a need to verify whether a setting, a mode or a state of a network node or of a hardware or software component of a network node can be changed in a way that compromises the tested networked system, the verification is done by simulating the effects of the change or by otherwise evaluating them without ever actually compromising the tested networked system.

16. "reporting function"—The function in a penetration testing process that handles reporting of results of the penetration testing. The reporting comprises at least one of (i) causing a display device to display a report including information about the results of the penetration testing, (ii) recording a report including information about the results of the penetration testing in a file, and (iii) electronically transmitting a report including information about the results of the penetration testing.

The functionality of a reporting function may be implemented by software executing in a remote computing device, for example in the computing device implementing the attack function of the penetration testing.

17. "recovery function" or "clean-up function"—The function in a penetration testing process that handles cleaning-up after a penetration test. The recovery includes undoing any operation done during the penetration testing process that results in compromising the tested networked system. The functionality of a recovery function may be implemented by any combination of (i) software executing in a remote computing device, for example in the computing device implementing the attack function of the penetration testing, (ii) an attack agent software module executing in one or more network nodes of the tested networked system.

18. "a campaign of penetration testing" or "penetration testing campaign" or just "campaign"—A specific run of a specific test of a specific networked system by the penetration testing system.

An execution of a campaign must end by one of the following: (i) determining by the penetration testing system that the goal of the attacker was reached by the campaign, (ii) determining by the penetration testing system that the goal of the attacker cannot be reached by the campaign, (iii) if the campaign is assigned a time limit, exceeding the time limit by the campaign, and (iv) manually terminating the campaign by a user of the penetration testing system.

19. "results of a penetration testing campaign"—Any output generated by the penetration testing campaign. This includes, among other things, data about any security vulnerability of the networked system tested by the penetration testing campaign that is detected by the campaign. It should be noted that in this context the word "results" is used in its plural form regardless of the amount of output data generated by the penetration testing campaign, including when the output consists of data about a single security vulnerability.

20. "information item of a campaign"—A variable data item that a penetration testing system must know its value before executing the campaign. Note that a data item must be able to have different values at different campaigns in order to be considered an information item of the campaign. If a data item always has the same value for all campaigns, it is not an information item of the campaign, even if it must be known and is being used by the penetration testing system when executing the campaign.

A type of an attacker and a goal of an attacker are examples of information items of a campaign. Another example of an information item of a campaign that is more complex than the previous two simple examples is a subset of the network nodes of the networked system that is assumed to be already compromised at the time of beginning the penetration testing campaign, with the subset defined either by an explicit selection of network nodes or by a Boolean condition each node of the subset has to satisfy.

A value of an information item may be composed either of a simple value or of both a main value and one or more auxiliary values. If a specific main value of an information item requires one or more auxiliary values that complete the full characterization of the value, then the combination of the main value and the one or more auxiliary values together is considered to be the value assigned to the information item. For example, for a "goal of the attacker" information item, after a user selects a main value of "exporting a specific file from whatever node having a copy of it", the user still has to provide a file name as an auxiliary value in order for the goal information item to be fully characterized. In this case the combination of "exporting a specific file from whatever node having a copy of it" and the specific file name is considered to be the value of the "goal of the attacker" information item.

21. "specifications of a campaign" or "scenario"—A collection of values assigned to all information items of the campaign. As having a value for each information item of a campaign is essential for running it, a campaign of a penetration testing system cannot be run without providing the penetration testing system with full specifications of the campaign. A value of an information item included in the specifications of a campaign may be manually selected by a user or may be automatically determined by the penetration testing system. In the latter case, the automatic determination by the system may depend on one or more values selected by the user for one or more information items of the campaign, or it may be independent of any selection by the user. For example, the selection of the capabilities of the attacker may automatically be determined by the system based on the user-selected type of the attacker, and the lateral movement strategy of the attacker may be automatically determined by the system independently of any user selection.

22. "pre-defined scenario", "pre-defined test scenario", "scenario template" or "template scenario"—A scenario that exists in storage accessible to a penetration testing system before the time a campaign is started, and can be selected by a user of the penetration testing system for defining a campaign of penetration testing.

A pre-defined scenario may be created and provided by the provider of the penetration testing system and may be part of a library of multiple pre-defined scenarios. Alternatively, a pre-defined scenario may be created by the user of the penetration testing system using a scenario editor provided by the provider of the penetration testing system.

A penetration testing system may require that a campaign of penetration testing that is based on a pre-defined scenario must have all its values of information items taken from the pre-defined scenario, with no exceptions. Alternatively, a penetration testing system may allow a user to select a pre-defined scenario and then override and change one or more values of information items of a campaign that is based on the pre-defined scenario.

23. "attacker" or "threat actor"—An entity, whether a single person, a group of persons or an organization, that might conduct an attack against a networked system by penetrating it for uncovering its security vulnerabilities and/or for compromising it.

24. "a type of an attacker"—A classification of the attacker that indicates its main incentive in conducting attacks of networked systems. Typical values for a type of an attacker are state-sponsored, opportunistic cyber criminal, organized cyber criminal and insider.

An attacker can have only a single type.

25. "a capability of an attacker"—A tool in the toolbox of the attacker. A capability describes a specific action that the attacker can perform. Examples of capabilities are copying a local file of a network node and exporting it to the attacker out of the networked system and remotely collecting database information from an SQL server of the networked system. In some systems, selecting a type of an attacker causes a corresponding default selection of capabilities for that type of attacker, but the user may have an option to override the default selection and add or delete capabilities.

An attacker can have one or multiple capabilities.

26. "a goal of an attacker"—What the attacker of a campaign is trying to achieve when attacking a targeted networked system. In other words, what is the criterion according to which the attacker will judge whether the attack was a success or a failure and/or to what extent was it a success or a failure. Selecting a type of an attacker may cause a default selection of a goal for that attacker, but the user may have an option to override the default selection. An attacker can have one or multiple goals.

27. "a lateral movement strategy of an attacker"—A decision logic applied by the attacker of a campaign for selecting the next network node to try to compromise. During a penetration testing campaign, the attacker is assumed to make progress by an iterative process in which in each iteration he selects the next node to attack, based on the group of network nodes he already controls (i.e. that are already compromised). If the attack on the selected node is successful, that node is added to the group of nodes that are already compromised, and another iteration starts. If the attempt to compromise the selected node fails, another node is selected, either according to some other rule or randomly. It should be noted that all types of penetration testing systems, whether using simulated penetration testing, actual attack penetration testing or some other form of penetration testing, must use a lateral movement strategy. In the case of a penetration testing system that actually attacks the tested networked system, the lateral movement strategy selects the path of attack actually taken through the networked system. In the case of a penetration testing system that simulates or evaluates the results of attacking the tested networked system, the lateral movement strategy selects the path of attack taken in the simulation or the evaluation through the networked system. Therefore in the above explanation, the term "attack" should be understood to mean "actual attack or simulated attack", the term "already controls" should be understood to mean "already controls or already determined to be able to control", the term "already compromised" should be understood to mean "already compromised or already determined to be compromisable", etc.

A simple example of a lateral movement strategy is a "depth first" strategy. In such strategy, the next network node to try to compromise is (i) either an immediate neighbor of or reachable from the last network node that was compromised, and (ii) is not yet compromised (provided such neighbor node exists). Another simple example is a "breadth search" strategy. In such strategy, the next network node to try to compromise is a network node whose distance from the first node compromised by the campaign is the smallest possible. The distance between two network nodes is the number of network nodes along the shortest path between them, plus one. A path is an ordered list of network nodes in which each pair of adjacent nodes in the list is a pair of immediate neighbors. Thus, the distance between two immediate neighbors is one.

An example of a more advanced lateral movement strategy is a strategy that is applicable when a goal of the attacker is related to a resource of the networked system that resides in a specific network node. In such case the next network node to try to compromise may be selected by determining the shortest path in the networked system leading from an already compromised node to the specific node containing the desired resource and picking the first node on this path to be the next node to try to compromise. Note that if the shortest path has a length of one (which happens when the specific node is an immediate neighbor of an already compromised node), then the next node to try to compromise is the specific node containing the desired resource.

Another example of a lateral movement strategy is a strategy that gives priority to network nodes satisfying a specific condition, for example nodes that are known to have a specific weakness, such as running the Windows XP operating system. In such case the next node to try to compromise is a node that satisfies the condition and is also either an immediate neighbor of or reachable from an already compromised node (if such node exists).

Typically, an attacker uses a single lateral movement strategy during an attack.

28. "network nodes A and B are immediate neighbors of each other"—Network nodes A and B have a direct communication link between them that does not pass through any other network node.

29. "network node A can communicate with network node B" or "network node B is reachable from network node A"—Network node A can send information (e.g. commands and/or data) to network node B. The sent information may be passed directly between the two network nodes without passing through any other network node, or it may be passed through one or more other nodes. The communication channel between the two network nodes may be a two-way communication channel, with which each of the two network nodes can send information to the other one. Alternatively, the communication channel may be a one-way communication channel, enabling network node A to send information to network node B, but not the other way around.

30. "accessing a network node"—Communicating with the network node in a way that provides the accessing entity an ability to perform an operation on one or more resources of the network node. For example, when a user logs into a first network node from a second network node, the second network node is accessing the first network node. As another example, when a file is read by a first network node from a shared folder in a second network node, the first network node is accessing the second network node. When a first node is accessing a second node, the second node is being accessed by or from the second network node.

31. "penetration testing by simulation" or "simulated penetration testing"—Penetration testing in which the methods used by the attack function are such that whenever there is a need to verify whether a setting, a mode or a state of a network node or of a hardware or software component of a network node can be changed in a way that compromises the tested networked system, the verification is done by simulating the effects of the change or by otherwise evaluating them without risking compromising the tested networked system.
32. "penetration testing by actual attack" or "actual attack penetration testing" or "penetration testing by actual exploit" or "actual exploit penetration testing"—Penetration testing in which the methods used by the attack function include executing a real attack on the tested networked system by attempting to change at least one setting, mode or state of a network node or of a hardware or software component of a network node in order to verify that the tested networked system may be compromised, such that the attempt may result in compromising the tested networked system.
33. "penetration testing by reconnaissance agents" or "reconnaissance agent penetration testing"—Penetration testing in which the functionality of the reconnaissance function is at least partially implemented by a reconnaissance agent software module installed and executed in each one of multiple network nodes of the tested networked system.
34. "reconnaissance client agent", "reconnaissance agent" or "recon agent"—A software module that can be installed on a network node and can be executed by a processor of that network node for partially or fully implementing the reconnaissance function of a penetration test. A reconnaissance agent must be capable, when executed by a processor of the network node in which it is installed, of collecting data at least about some of the events occurring in the network node. Such events may be internal events of the network node or messages sent out of the network node or received by the network node. A reconnaissance agent may be capable of collecting data about all types of internal events of its hosting network node. Additionally, it may be capable of collecting other types of data of its hosting network node. A reconnaissance agent may additionally be capable of collecting data about other network nodes or about other components of a networked system containing the hosting network node. A reconnaissance agent may be persistently installed on a network node, where "persistently" means that once installed on a network node the reconnaissance agent survives a reboot of the network node. Alternatively, a reconnaissance agent may be non-persistently installed on a network node, where "non-persistently" means that the reconnaissance agent does not survive a reboot of the network node and consequently should be installed again on the network node for a new penetration test in which the network node takes part, if the network node was rebooted since the previous penetration test in which it took part.
35. "attack client agent" or "attack agent"—A software module that can be installed on a network node and can be executed by a processor of that network node for partially or fully implementing the attack function of a penetration test. Typically, an attack agent is installed by an actual attack penetration testing system in a network node that it had succeeded to compromise during a penetration test. Once installed on such network node, the attack agent may be used as a tool for compromising other network nodes in the same networked system. In such case, the attack agent may include code that when executed by a processor of the compromised network node compromises another network node that is adjacent to it in the networked system, possibly taking advantage of the high level of trust it may have from the point of view of the adjacent network node. Another type of an attack agent may include code that when executed by a processor of a network node determines whether that network node would be compromised if a given operation is performed.
36. "penetration testing software module" or "remote computing device penetration testing software module"—A software module that implements the full functionality of a penetration testing system, except for the functionality implemented by (i) reconnaissance agents, (ii) attack agents, and (iii) hardware and/or software simulating or duplicating the tested networked system, if such components are used in the implementation of the penetration testing system. The penetration testing software module may be installed and executed on a single computing device or comprise multiple software components that reside on multiple computing devices. For example, a first component of the penetration testing software module may implement part or all of the reconnaissance function and be installed and executed on a first computing device, a second component of the penetration testing software module may implement part or all of the attack function and be installed and executed on a second computing device, and a third component of the penetration testing software module may implement the reporting function and be installed and executed on a third computing device.
37. "internal data of a network node"—Data related to the network node that is only directly accessible to code executing by a processor of the network node and is only accessible to any code executing outside of the network node by receiving it from code executing by a processor of the network node. Examples of internal data of a network node are data about internal events of the network node, data about internal conditions of the network node, and internal factual data of the network node.
38. "internal event of/in a network node"—An event occurring in the network node whose occurrence is only directly detectable by code executing by a processor of the network node. Examples of an internal event of a network node are an insertion of a USB drive into a port of the network node, and a removal of a USB drive from a port of the network node. An internal event may be a free event or a non-free event.
   It should be noted that the term "an event of X" refers to any occurrence of an event of the type X and not to a specific occurrence of it. For referring to a specific occurrence of an event of type X one should explicitly say "an occurrence of event of X". Thus, a software module which looks for detecting insertions of a USB drive into a port is "detecting an event of USB drive insertion", while after that module had detected such event it may report "an occurrence of an event of USB drive insertion".
39. "internal condition of/in a network node"—A Boolean condition related to the network node which can only be directly tested by code executing by a processor of the network node. Examples of an internal condition of a network node are whether the local disk of the terminal node is more than 98% full or not, and whether a USB drive is currently inserted in a port of the network node.
40. "internal factual data of/in a network node" or "internal facts of a network node"—Facts related to the network node which can only be directly found by code executing by a processor of the network node. Examples of factual data of a network node are the version of the firmware of a solid-state drive installed in the network node, the hardware version of a processor of the network node, and the amount of free space in a local disk of the network node.

41. "resource of a network node"—A file in the network node, a folder in the network node, credentials of a user residing in the network node (the credentials not necessarily applying to the network node containing the credentials), a peripheral device of the network node or a communication device accessible to the network node.

42. "resource of a networked system"—A file in a network node of the networked system, a folder in a network node of the networked system, credentials of a user of the networked system, a peripheral device of a network node of the networked system, a peripheral device directly attached to a network of the networked system, or a communication device accessible by a network node of the networked system.

43. "access rights" (of a user in a network node)—Rights of the user to perform operations on resources of the network node. For example, a right to execute a given file or a given class of files, a right to read from a given file or from a given folder, a right to create a new file in a given folder, a right to change a given file, a right to print on a given printer, or a right to send out data through a given communication device.

Access rights may be conditioned on the user authenticating himself before getting the rights to perform the relevant operations. In this disclosure, a user is said to have certain access rights only if he is able to authenticate himself to the extent required for using those certain access rights.

It should be noted that sometimes a user may have access rights to a given network node that allow him to perform some operations in the given network node when he is locally accessing the given network node, but do not allow him to perform those operations when he is remotely accessing the given network node from another network node. In this disclosure, the term "access rights" includes only access rights that are useful for remote access (and optionally also for local access).

It should also be noted, that in this disclosure, the term "access rights" in the plural may be used even if only a single right is involved.

44. "user credentials"—An attestation issued to the user for authenticating himself in order to be allowed to use access rights granted to him in one or more network nodes. User credentials may include a user name, a user ID, a password, any combination of the three, or any other data item which is expected not to be available to other people.

45. "compromising a network node"—Successfully causing execution of an operation in the network node that is not allowed for the entity requesting the operation by the rules defined by an administrator of the network node, or successfully causing execution of code in a software module of the network node that was not predicted by the vendor of the software module. Examples for compromising a network node are reading a file without having read permission for it, modifying a file without having write permission for it, deleting a file without having delete permission for it, exporting a file out of the network node without having permission to do so, getting an access right higher than the one originally assigned without having permission to get it, getting a priority higher than the one originally assigned without having permission to get it, changing a configuration of a firewall network node such that it allows access to other network nodes that were previously hidden behind the firewall without having permission to do it, and causing execution of software code by utilizing a buffer overflow. As shown by the firewall example, the effects of compromising a certain network node are not necessarily limited to that certain network node. In addition, executing successful ARP spoofing, denial-of-service, man-in-the-middle or session-hijacking attacks against a network node are also considered compromising that network node, even if not satisfying any of the conditions listed above in this definition.

46. "ARP spoofing"—a technique for compromising a target network node in which an attacker sends a false Address Resolution Protocol (ARP) reply message to the target network node. The aim is to associate an attacker's MAC address (either a MAC address of the node sending the false ARP reply message or a MAC address of another node controlled by the attacker) with the IP address of another host, such as the default gateway, causing any traffic sent by the target node and meant for that IP address to be sent to the attacker instead. ARP spoofing may allow an attacker to intercept data frames on a network, modify the traffic, or stop all traffic to a certain node. Often the attack is used as an opening for other attacks, such as denial-of-service, man-in-the-middle, or session-hijacking attacks.

47. "denial-of-service attack"—a cyber-attack where an attacker seeks to make a service provided by a network node to other network nodes unavailable to its intended users either temporarily or indefinitely. The denial-of-service attack may be accomplished by flooding the node providing the targeted service with superfluous requests in an attempt to overload it and prevent some or all legitimate requests from being fulfilled. Alternatively, the denial-of-service attack may be accomplished by causing some or all of the legitimate requests addressed to the targeted service to not reach their destination.

48 "man-in-the-middle attack"—a cyber-attack where an attacker secretly relays and possibly alters the communication between two network nodes who believe they are directly communicating with each other. One example of man-in-the-middle attacks is active eavesdropping, in which the attacker makes independent connections with the victims and relays messages between them to make them believe they are communicating directly with each other, when in fact the entire communication session is controlled by the attacker. The attacker must be able to intercept all relevant messages passing between the two victims and inject new ones.

49. "session-hijacking attack"—a cyber-attack where a valid communication session between two network nodes in a networked system is used by an attacker to gain unauthorized access to information or services in the networked computer system.

50. "compromising a networked system"—Compromising at least one network node of the networked system or successfully causing execution of an operation in the networked system that is not allowed for the entity requesting the operation by the rules defined by an administrator of the networked system. Examples for operations in the networked system that may not be allowed are exporting a file out of the networked system without having permission to do so, sending a file to a network printer without having permission to do so, and copying a file from one network node to another network node without having permission to do so.

51. "compromising a software application"—Successfully causing the software application to execute an operation that is not allowed for the entity requesting the operation by the rules defined by an administrator of the network node on which the software application is installed or by a vendor of the software application, or successfully causing the execution of code in the software application that was not predicted by the vendor of the software application. Examples for compromising a software application are changing a configuration file controlling the operation of the software application without having permission for doing so, and activating a privileged function of the software application without having permission for doing so. In addition, causing the software application to execute a macro without checking rights of the macro code to do what it is attempting to do is also considered compromising that software application, even if not satisfying any of the conditions listed above in this definition.

52. "administrator of a network node"—Any person that is authorized, among other things, to define or change at least one rule controlling at least one of an access right, a permission, a priority and a configuration in the network node.

53. "administrator of a networked system"—Any person that is authorized, among other things, to define or change at least one rule controlling at least one of an access right, a permission, a priority and a configuration in the networked system. Note that an administrator of a networked system may also be an administrator of one or more of the network nodes of the networked system.

54. "achieving full control of a computing device"—For a multi-user computing device that distinguishes between administrator and non-administrator users, logging into the computing device with administrator access rights. For a single-user computing device, logging into the computing device as the single user.

55. "privilege escalation"—An act of exploiting a bug, a design flaw or a configuration oversight in an operating system or software application to gain elevated access to resources that are normally protected from a user or an application. The result is that a user or an application can perform unauthorized actions that were not intended by the system administrator or the application developer.

56. "memory dump of a network node"—A portion of or all the content of the RAM working memory of the network node. The memory dump may be copied from the RAM to another memory (e.g. a hard disk) before being read and processed, or it may be read and processed while still in the RAM memory.

57. "remote computing device" or "penetration testing remote computing device" (with respect to a given networked system)—A computing device that executes software implementing part or all of the penetration testing software module that is used for testing the given networked system.

A remote computing device may be (i) outside of the given networked system, or (ii) inside the given networked system. In other words, a remote computing device is not necessarily physically remote from the given networked system. It is called "remote" to indicate its functionality is logically separate from the functionality of the given networked system.

A remote computing device may (i) be a dedicated computing device that is dedicated only to doing penetration testing, or (ii) also implement other functionality not directly related to penetration testing.

A remote computing device is not limited to be a single physical device with a single processing unit. It may be implemented by multiple separate physical devices packaged in separate packages that may be located at different locations. Each of the separate physical devices may include one or multiple processing units. A remote computing device may be (i) a physical computing device, or (ii) a virtual machine running inside a physical computing device on top of a hosting operating system.

58. "explicitly selecting"—Directly and clearly selecting, by a human user, of one option out of multiple options available to the human user, leaving no room for doubt and not relying on making deductions by a computing device. Examples of explicit selections are (i) selection of a specific type of an attacker from a drop-down list of types, (ii) selection of specific one or more attacker capabilities by marking one or more check boxes in a group of multiple check boxes corresponding to multiple attacker capabilities, and (iii) reception for viewing by a user of a recommendation automatically computed by a computing device for a value of an information item and actively approving by the user of the recommendation for using the value, provided that the approving user has an option of rejecting the recommendation and selecting a different value for the information item.

Examples of selections that are not explicit selections are (i) selection of specific one or more attacker capabilities by selecting a specific scenario of a penetration testing system from a pre-defined library of scenarios, where the specific scenario includes an attacker having the one or more capabilities, and (ii) selection of specific one or more attacker capabilities by selecting a specific goal of an attacker, accompanied by a deduction by a computing device concluding that the specific one or more attacker capabilities must be selected because they are essential for the attacker to succeed in meeting the specific goal.

59. "automatically selecting"—Selecting, by a computing device, of one option out of multiple options, without receiving from a human user an explicit selection of the selected option. It should be noted that the selecting of an option is an automatic selecting even if the computing device is basing the selection on one or more explicit selections by the user, as long as the selected option itself is not explicitly selected by the user. It should also be noted that receiving from a user of an approval for a recommendation which is otherwise automatically selected without giving the user an ability to override the recommendation does not make the selection a non-automatic selection.

An example of an automatic selection is a selection by a computing device of one or more attacker capabilities by (a) receiving from a user an explicit selection of a specific scenario of a penetration testing system from a pre-defined library of scenarios, (b) determining by the computing device that the specific scenario includes an attacker having the one or more capabilities, and (c) deducing by the computing device that the user wants to select the one or more attacker capabilities.

An example of a selection that is not an automatic selection is a selection of a value for an information item by (a) calculating by a computing device of a recommended value for the information item, (b) displaying the recommendation to a user, and (c) receiving from the user an explicit approval to use the recommended value of the information item, provided that the approving user has an option of rejecting the recommendation and selecting a different value for the information item.
60. "defensive application"—A software application whose task is to defend the network node in which it is installed against potential attackers. A defensive application may be a passive defensive application, in which case it only detects and reports penetration attempts into its hosting network node but does not attempt to defend against the detected attacks. Alternatively, a defensive application may be an active defensive application, in which case it not only detects penetration attempts into its hosting network node but also attempts to defend its hosting node against the detected attacks by activating at least one counter-measure.
61. "user interface"—A man-machine interface that does at least one of (i) providing information to a user, and (ii) receiving input from the user. Towards this end, any user interface includes at least one of (i) an input device (e.g. touch-screen, mouse, keyboard, joystick, camera) for receiving input from the user, and (ii) an output device (e.g. display screen such as a touch-screen, speaker) for providing information to the user. A user interface typically also includes executable user-interface code for at least one of (i) causing the output device to provide information to the user (e.g. to display text associated with radio-buttons or with a check list, or text of a drop-down list) and (ii) processing user-input received via the input device.

In different examples, the executable code may be compiled-code (e.g. in assembly or machine-language), interpreted byte-code (e.g. Java byte-code), or browser-executed code (e.g. JavaScript code) that may be sent to a client device from a remote server and then executed by the client device.

62. "user interface of a computing device"—A user interface that is functionally attached to the computing device and serves the computing device for interacting with the user.

An input device of a user interface of a computing device may share a common housing with the computing device (e.g. a touch-screen of a tablet), or may be physically separate from the computing device and be in communication with it, either through a physical port (e.g. a USB port) or wirelessly (e.g. a wireless mouse).

An output device of a user interface of a computing device may share a common housing with the computing device (e.g. a touch-screen of a tablet), or may be physically separate from the computing device and be in communication with it, either through a physical port (e.g. an HDMI port) or wirelessly. User-interface code of a user interface of a computing device is stored in a memory accessible to the computing device and is executed by one or more processors of the computing device. In one example related to web-based user interfaces, at least some of this code may be received from a remote server and then locally executed by the computing device which functions as a client. In another example related to locally-implemented user interfaces, all of the user-interface code is pre-loaded onto the computing device.

63. "random selection"—A selection that depends on a random or pseudo-random factor. Different possible outcomes in a random selection do not necessarily have the same probabilities of being selected.
64. "hash function"—any function that maps data of fixed or arbitrary size to data of fixed size, where the output in smaller in size than the input. For example, the function D=A XOR B XOR C (where A, B, C and D are all 32 bit unsigned numbers) is a hash function, as it maps an input of size 3×32=96 bits to an output of size 32 bits. The output of a hash function is called "a hash value" or simply "a hash".
65. "attacker step"—One or more actions performed by an attacker of a networked system in order to achieve a certain result. An attacker step may be included in an actual or potential attempt of an attacker to compromise a networked system that includes one or more attacker steps. Performing a given attacker step may be conditioned on certain achievements being already achieved by the attacker prior to carrying out the given attacker step.

An example of an attacker step that consists of a single action is the recovering of a password enabling access to a given network node from a known hash code (e.g. using a pre-compiled dictionary of hash codes and their corresponding passwords, when the algorithm of hashing is known). In this example, the attacker step is conditioned on a prior achievement by the attacker of finding out the hash code.

An example of an attacker step that consists of multiple actions is the recovering of a password enabling access to a given network node based on an ability to remotely execute arbitrary code in the given network node (e.g. remotely executing in the given network node code that obtains a hash code of a password enabling access to the given network node, and then recovering the corresponding password from its hash code as in the previous example). In this example, the attacker step is conditioned on a prior achievement by the attacker of obtaining an ability to remotely execute arbitrary code in the given network node. As can be seen from the above examples, the breaking out of a potential attack plan into attacker steps is somewhat arbitrary. The second example above including a single attacker step consisting of two actions could have been defined to include two separate attacker steps, each including a single action—the first attacker step consisting of remotely executing in the given network node code that obtains the hash code, and the second attacker step consisting of recovering the password from its hash code.

66. "remediation action" or just "remediation"—An action that improves the security of a networked system by making one or more attacker steps practically unavailable, more expensive, more difficult, less efficient and/or less useful for attackers of the networked system.

An example of a remediation action that makes only a single attacker step practically unavailable to attackers is the installing of a defensive measure applicable only to a single network node (e.g. installing in a single network node a software utility that locally requires fingerprints identification on top of requiring a password in order to allow access).

An example of a remediation action that makes multiple attacker steps practically unavailable to attackers is the replacing of a common algorithm or a common method used in multiple network nodes of the networked system by an improved algorithm or method (e.g. the global replacing of a simple password hash code calculation algorithm by an improved password hash code algorithm that uses salt in its calculation). In such case, each given network node benefiting from the improved algorithm corresponds to a different attacker step targeting the given network node.

A remediation action that makes the one or more attacker steps practically unavailable does not necessarily make the one or more attacker steps completely unavailable to the attackers. If an action makes the one or more attacker steps too costly for the attackers to use (i.e. makes the cost of exploitation of the one or more attacker steps so high that there is very low probability that the attackers would use them), then the action is considered to make the one or more attacker steps practically unavailable to the attackers and therefore is a remediation action. An example of a remediation action that does not make the one or more attacker steps practically unavailable to the attackers is an action of replacing an encryption algorithm using a short key with a similar encryption algorithm using a longer key. This may result in the deciphering of the encrypted data by an attacker taking a much longer time than before. This in turn makes the one or more attacker steps less efficient to use, and therefore such action is considered to be a remediation action.

67. "sub-goal" or "achievement"—A result or ability obtained by an attacker by successfully performing an attacker step against a networked system, where the attacker was not in possession of the result or ability before performing the attacker step.

For example, obtaining a password enabling access to a given network node of the networked system is a possible sub-goal. It may be obtained by an attacker by carrying out the attacker step "recovering of a password to the given network node from a known password hash code".

A special case of a sub-goal is a dummy sub-goal representing a state in which an attacker has no possession of any result or ability which is not available to all. A dummy sub-goal is assumed to be achievable by any attacker even before carrying out any attacker step.

In some cases, a sub-goal may be automatically obtained by an attacker following the obtaining of another sub-goal, without having to perform any additional attacker step. For example, the sub-goal "compromise either node X or node Y" is automatically obtained once the sub-goal "compromise node X" was obtained, without having to perform any additional attacker step. In such case it can be assumed that the sub-goal is obtained by a dummy attacker step that does nothing.

68. "path of attack of a networked system" or "a branch of attack of a networked system"—An ordered sequence of one or more attacker steps and one or more sub-goals in the networked system, that starts with a starting sub-goal that is assumed to be achievable by attackers and ends with a final sub-goal that is assumed to be a goal of attackers when attacking the networked system. The starting sub-goal may be a dummy sub-goal representing a state in which an attacker has no possession of any result or ability which is not available to all. Alternatively, the starting sub-goal may be a non-dummy sub-goal representing a state in which an attacker is in possession of a result or an ability not available to all, which sub-goal is assumed to be available to the attacker for the purpose of the present testing.

A path of attack may be represented using multiple different representation forms, including but not limited to various forms of graphs and lists. In other words, different representation forms of a path of attack may represent the same path of attack, in which case they are equivalent to each other. Typically, but not necessarily, a given path of attack satisfies the following conditions: (A) each attacker step included in the given path of attack is preceded by a sub-goal and followed by a sub-goal in the given path of attack, (B) each sub-goal included in the given path of attack, except for the starting sub-goal of the given path of attack, is preceded by an attacker step in the given path of attack, (C) each sub-goal included in the given path of attack, except for the final sub-goal of the given path of attack, is followed by an attacker step in the given path of attack.

69. "blocking an attacker step", "blocking a vulnerability", "blocking a way for an attacker to compromise"—Making the attacker step or the exploitation of the vulnerability or the way to compromise (as the case may be) practically unavailable, more expensive, more difficult, less efficient and/or less useful to attackers. The blocking of the attacker step or the exploitation of the vulnerability or the way to compromise is done by implementing a remediation action.

70. "a Boolean condition"—A statement that can have a value of either true or false. If the statement is true, we say that the Boolean condition is satisfied. If the statement is false, we say that the Boolean condition is not satisfied.

71. "subset/subgroup of a given set/group" or "sub-set/sub-group of a given set/group"—A set/group that satisfies the condition that that every member of it is also a member of the given set/group. Unless otherwise stated, a subset/subgroup may be empty and contain no members at all. Unless otherwise stated, a subset/subgroup of a given set/group may contain all the members of the given set/group and be equal to the given set/group.

72. "proper subset/subgroup of a given set/group" or "proper sub-set/sub-group of a given set/group"—A subset/subgroup of the given set/group that is not equal to the given set/group. In other words, there is at least one member of the given set/group that is not a member of the subset/subgroup.

73. "or"—A logical operator combining two Boolean input conditions into a Boolean compound condition, such that the compound condition is satisfied if and only if at least one of the two input conditions is satisfied. In other words, if condition C=condition A or condition B, then condition C is not satisfied when both condition A and condition B are not satisfied, but is satisfied in each of the following cases: (i) condition A is satisfied and condition B is not satisfied, (ii) condition A is not satisfied and condition B is satisfied, and (iii) both condition A and condition B are satisfied.

74. "one of A and B"—If A and B are specific items, then "one of A and B" is equivalent to "only A or only B, but not both". For example, "one of John and Mary" is equivalent to "only John or only Mary, but not both John and Mary". If A and B are categories, then "one of A and B" is equivalent to "only one of A or only one of B, but not both one of A and one of B". For example, "one of a dog and a cat" is equivalent to "only one dog or only one cat, but not both one dog and one cat". Similarly, if A and B are specific items, then "at least one of A and B" is equivalent to "only A or only B, or both A and B". For example, "at least one of John and Mary" is equivalent to "only John or only Mary, or both John and Mary". If A and B are categories, then "at least one of A and B" is equivalent to "only at least one of A or only at least one of B, or both at least one of A and at least one of B". For example, "at least one of a dog and a cat" is equivalent to "only at least one dog or only at least one cat, or both at least one dog and at least one cat".

Note that in "one of dogs and cats", "dogs" and "cats" are not categories but specific groups (i.e. specific items). Therefore, "one of dogs and cats" is equivalent to "only dogs or only cats, but not both dogs and cats". Similarly, "at least one of dogs and cats" is equivalent to "only dogs or only cats, or both dogs and cats".

If A, B and C are specific items, then "one of A, B and C" is equivalent to "only A or only B or only C, but not a combination of two or three members of the group consisting of: A, B and C", and "at least one of A, B and C" is equivalent to "only A or only B or only C, or any combination of two or three members of the group consisting of: A, B and C".

If A, B and C are categories, then "one of A, B and C" is equivalent to "only one of A or only one of B or only one of C, but not a combination of two or three members of the group consisting of: one of A, one of B and one of C", and "at least one of A, B and C" is equivalent to "only at least one of A or only at least one of B or only at least one of C, or any combination of two or three members of the group consisting of: one of A, one of B and one of C". If the list following the "one of" or the "at least one of" contains more than three members, then the previous definitions are again applicable, with the appropriate modifications that extrapolate the above logic. Note that "one or more of" is equivalent to "at least one of", and the two terms are synonyms.

The invention claimed is:

1. A method for carrying out a penetration testing campaign in a networked system by a penetration testing system, the carrying out of the penetration testing campaign being for determining a way for an attacker to compromise the networked system, the method comprising:
   a. determining that the attacker can obtain user credentials of a first user;
   b. determining that, when using the user credentials, the first user has access rights to a first network node of the networked system;
   c. determining that a second network node of the networked system, different from the first network node, is compromisable by the attacker during the penetration testing campaign;
   d. determining that the first network node was accessed from the second network node;
   e. based on (i) the determining that the attacker can obtain the user credentials of the first user, (ii) the determining that, when using the user credentials, the first user has access rights to the first network node, (iii) the determining that the second network node is compromisable by the attacker, and (iv) the determining that the first network node was accessed from the second network node, determining that the first network node is compromisable by the attacker during the penetration testing campaign;
   f. determining the way for the attacker to compromise the networked system, the way for the attacker to compromise the networked system including a step of compromising the first network node using the user credentials of the first user; and
   g. reporting the determined way for the attacker to compromise the networked system, the reporting comprising at least one operation selected from the group consisting of (i) causing a display device to display a report including information about the determined way to compromise the networked system, (ii) recording the report including the information about the determined way to compromise the networked system in a file, and (iii) electronically transmitting the report including the information about the determined way to compromise the networked system.

2. The method of claim 1, wherein the determining that the attacker can obtain the user credentials of the first user comprises determining that the attacker can obtain a passwords file which contains the user credentials of the first user.

3. The method of claim 1, wherein the determining that the attacker can obtain the user credentials of the first user comprises determining that, subsequent to the first user logging into a third network node of the networked system which is already known to be compromisable by the attacker, the attacker can extract the user credentials of the first user from a memory dump of the third network node.

4. The method of claim 1, wherein the determining that the attacker can obtain the user credentials of the first user comprises determining that the attacker can obtain a password of the first user by trying multiple guessed passwords that are known to be commonly used as passwords by users.

5. The method of claim 1, wherein the determining that, when using the user credentials, the first user has access rights to the first network node comprises determining that the first user is included in a list of local administrators of the first network node.

6. The method of claim 1, wherein the determining that, when using the user credentials, the first user has access rights to the first network node comprises determining that the first user had logged into the first network node.

7. The method of claim 1, wherein the determining that the first network node was accessed from the second network node comprises (i) extracting, from a memory dump of the first network node, a network address from which the first network node was accessed and (ii) identifying the network address to be associated with the second network node.

8. The method of claim 1, wherein the determining that the first network node was accessed from the second network node is carried out prior to the carrying out of the penetration testing campaign.

9. The method of claim 1, wherein the determining that the first network node was accessed from the second network node comprises determining that the first network node was accessed from the second network node using user credentials of a second user that is different from the first user.

10. The method of claim 1, wherein the determining that the first network node was accessed from the second network node comprises determining that the first network node was accessed from the second network node using the user credentials of the first user.

11. The method of claim 1, wherein the determining that the first network node was accessed from the second network node comprises determining that a file in a shared folder in the first network node was read by the second network node.

12. The method of claim 1, wherein the penetration testing system comprises a reconnaissance agent software module that is installed on at least some of the network nodes of the networked system, and wherein the determining that the attacker can obtain user credentials of the first user is done, at least in part, by executing the reconnaissance agent software module in one of the network nodes of the networked system.

13. The method of claim 1, wherein the penetration testing system comprises a reconnaissance agent software module that is installed on at least some of the network nodes of the networked system, and wherein the determining that the first user has access rights to the first network node is done, at least in part, by executing the reconnaissance agent software module in the first network node.

14. The method of claim 1, wherein the penetration testing system comprises a reconnaissance agent software module that is installed on at least some of the network nodes of the networked system, and wherein the determining that the first network node was accessed from the second network node is done, at least in part, by executing the reconnaissance agent software module in the first network node.

15. The method of claim 1, further comprising:
   h. determining that the attacker can obtain second user credentials of a second user;
   i. determining that, when using the second user credentials, the second user has access rights to a third network node of the networked system;
   j. during a monitoring time interval, failing to detect the third network node being accessed from a network node that is already known to be compromisable; and
   k. based on the failing to detect the third network node being accessed from a network node that is already known to be compromisable, concluding that the third network node is not compromisable by the attacker using the second user credentials during the penetration testing campaign.

16. The method of claim 1, further comprising:
   h. determining that the attacker can obtain second user credentials of a second user;
   i. determining that, when using the second user credentials, the second user has access rights to a third network node of the networked system;
   j. during a monitoring time interval, failing to detect the third network node being accessed from a network node that is already known to be compromisable;
   k. determining a second way for the attacker to compromise the networked system, the second way for the attacker to compromise the networked system including a step of compromising the third network node using the second user credentials of the second user; and
   l. reporting the determined second way for the attacker to compromise the networked system, wherein the determined way for the attacker to compromise the networked system is reported as more important than the determined second way for the attacker to compromise the networked system.

17. The method of claim 1, further comprising:
   h. determining that the attacker can obtain second user credentials of a second user;
   i. determining that, when using the second user credentials, the second user has access rights to a third network node of the networked system;
   j. during a monitoring time interval, failing to detect the third network node being accessed from a network node that is already known to be compromisable;
   k. determining a second way for the attacker to compromise the networked system, the second way for the attacker to compromise the networked system including a step of compromising the third network node using the second user credentials of the second user; and
   l. providing recommendations for blocking both the determined way for the attacker to compromise the networked system and the determined second way for the attacker to compromise the networked system, wherein the recommendation for blocking the determined way is given a higher priority than the recommendation for blocking the determined second way.

18. A penetration testing system for carrying out a penetration testing campaign in a networked system, the carrying out of the penetration testing campaign being for determining a way for an attacker to compromise the networked system, the system comprising:
   a. a remote computing device comprising a computer memory and one or more processors, the remote computing device in electronic communication with at least some network nodes of the networked system; and
   b. a penetration-testing non-transitory computer-readable storage medium having stored therein program instructions of a penetration testing software module, which when executed by the one or more processors of the remote computing device cause the one or more processors of the remote computing device to carry out the following steps:
      i. determining that the attacker can obtain user credentials of a first user, wherein the determining that the attacker can obtain user credentials of the first user comprises one of (A) concluding that the attacker can obtain user credentials of the first user and (B) receiving, from a network node of the networked system, information about a determination that the attacker can obtain user credentials of the first user,
      ii. determining that, when using the user credentials, the first user has access rights to a first network node of the networked system, wherein the determining that when using the user credentials, the first user has access rights to the first network node of the networked system comprises one of (A) concluding that when using the user credentials, the first user has access rights to the first network node of the networked system, and (B) receiving, from a network node of the networked system, information about a determination that when using the user credentials, the first user has access rights to the first network node of the networked system,
      iii. determining that a second network node of the networked system, different from the first network node, is compromisable by the attacker during the penetration testing campaign,
      iv. determining that the first network node was accessed from the second network node, wherein the determining that the first network node was accessed from the second network node comprises one of (A) concluding that the first network node was accessed from the second network node and (B) receiving, from a network node of the networked system, information about a determination that the first network node was accessed from the second network node,
      v. based on (A) the determining that the attacker can obtain the user credentials of the first user, (B) the determining that, when using the user credentials, the first user has access rights to the first network node, (C) the determining that the second network node is compromisable by the attacker, and (D) the determining that the first network node was accessed from the second network node, determining that the first network node is compromisable by the attacker during the penetration testing campaign,
      vi. determining the way for the attacker to compromise the networked system, the way for the attacker to compromise the networked system including a step of compromising the first network node using the user credentials of the first user, and vii. reporting the determined way for the attacker to compromise the networked system, the reporting comprising at least one operation selected from the group consisting of (A) causing a display device to display a report including information about the determined way to compromise the networked system, (B) recording the report including the information about the determined way to compromise the networked system in a file, and (C) electronically transmitting the report including the information about the determined way to compromise the networked system.

19. A method for carrying out a penetration testing campaign in a networked system by a penetration testing system, the carrying out of the penetration testing campaign being for determining a way for an attacker to compromise the networked system, the method comprising:

a. obtaining user credentials of a first user;
b. determining that, when using the user credentials, the first user has access rights to a first network node of the networked system;
c. during the penetration testing campaign, compromising a second network node of the networked system, the second network node being different from the first network node;
d. determining that the first network node was accessed from the second network node;
e. based on (i) the obtaining of the user credentials of the first user, (ii) the determining that, when using the user credentials, the first user has access rights to the first network node, (iii) the compromising of the second network node, and (iv) the determining that the first network node was accessed from the second network node, determining that the first network node is compromisable by the attacker during the penetration testing campaign without compromising the first network node during the penetration testing campaign;
f. determining the way for the attacker to compromise the networked system, the way for the attacker to compromise the networked system including a step of compromising the first network node using the user credentials of the first user; and
g. reporting the determined way for the attacker to compromise the networked system, the reporting comprising at least one operation selected from the group consisting of (i) causing a display device to display a report including information about the determined way to compromise the networked system, (ii) recording the report including the information about the determined way to compromise the networked system in a file, and (iii) electronically transmitting the report including the information about the determined way to compromise the networked system.

20. A penetration testing system for carrying out a penetration testing campaign in a networked system, the carrying out of the penetration testing campaign being for determining a way for an attacker to compromise the networked system, the system comprising:

a. a remote computing device comprising a computer memory and one or more processors, the remote computing device in electronic communication with at least some network nodes of the networked system; and b. a penetration-testing non-transitory computer-readable storage medium having stored therein program instructions of a penetration testing software module, which when executed by the one or more processors of the remote computing device cause the one or more processors of the remote computing device to carry out the following steps:

i. obtaining user credentials of a first user,
ii. determining that, when using the user credentials, the first user has access rights to a first network node of the networked system, wherein the determining that when using the user credentials, the first user has access rights to the first network node of the networked system comprises one of (A) concluding that when using the user credentials, the first user has access rights to the first network node of the networked system, and (B) receiving, from a network node of the networked system, information about a determination that when using the user credentials, the first user has access rights to the first network node of the networked system,
iii. during the penetration testing campaign, compromising a second network node of the networked system, the second network node being different from the first network node,
iv. determining that the first network node was accessed from the second network node, wherein the determining that the first network node was accessed from the second network node comprises one of (A) concluding that the first network node was accessed from the second network node and (B) receiving, from a network node of the networked system, information about a determination that the first network node was accessed from the second network node,
v. based on (A) the obtaining of the user credentials of the first user, (B) the determining that, when using the user credentials, the first user has access rights to the first network node, (C) the compromising of the second network node, and (D) the determining that the first network node was accessed from the second network node, determining that the first network node is compromisable by the attacker during the penetration testing campaign,
vi. determining the way for the attacker to compromise the networked system, the way for the attacker to compromise the networked system including a step of compromising the first network node using the user credentials of the first user, and
vii. reporting the determined way for the attacker to compromise the networked system, the reporting comprising at least one operation selected from the group consisting of (A) causing a display device to display a report including information about the determined way to compromise the networked system, (B) recording the report including the information about the determined way to compromise the networked system in a file, and (C) electronically transmitting the report including the information about the determined way to compromise the networked system.

* * * * *